United States Patent [19]

Freeman et al.

[11] Patent Number: 5,861,881
[45] Date of Patent: *Jan. 19, 1999

[54] INTERACTIVE COMPUTER SYSTEM FOR PROVIDING AN INTERACTIVE PRESENTATION WITH PERSONALIZED VIDEO, AUDIO AND GRAPHICS RESPONSES FOR MULTIPLE VIEWERS

[75] Inventors: Michael J. Freeman; Gregory W. Harper, both of New York, N.Y.

[73] Assignee: ACTV, Inc., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 598,382

[22] Filed: Feb. 8, 1996

Related U.S. Application Data

[63] Continuation-in-part of Ser. No. 443,607, May 18, 1995, Pat. No. 5,724,091, which is a continuation-in-part of Ser. No. 166,608, Dec. 13, 1993, abandoned, which is a continuation of Ser. No. 797,298, Nov. 25, 1991, abandoned.

[51] Int. Cl.$^6$ .................................................. H04N 7/173
[52] U.S. Cl. .............................................. 345/302; 348/10
[58] Field of Search .................................... 395/762, 806, 395/807, 173, 174, 327, 328; 434/307 R, 308; 364/514 A; 348/7, 8, 10; 345/302, 473, 474, 327, 328; 707/501

[56] References Cited

U.S. PATENT DOCUMENTS

| | | |
|---|---|---|
| 2,612,553 | 9/1952 | Homrighous . |
| 2,777,901 | 1/1957 | Dostert .................................. 179/100.2 |

(List continued on next page.)

FOREIGN PATENT DOCUMENTS

| | | |
|---|---|---|
| 16314 | 10/1980 | European Pat. Off. . |
| 128481 | 12/1984 | European Pat. Off. . |
| 314572 | 5/1989 | European Pat. Off. . |
| 994233 | 6/1965 | Germany . |
| 4207885 | 7/1992 | Japan . |
| 6165170 | 6/1994 | Japan . |
| 8102961 | 10/1981 | WIPO . |
| 9403851 | 2/1994 | WIPO . |

OTHER PUBLICATIONS

Harless et al., Interactive Video Disc Case Studies for Medical Education, Proceedings, 10th Annual Symposium on Computer Applications in Medical Care, Oct. 25–26, 1986, pp. 183–187.

Bock, Videodisk Standards: A Software View of the Technology, 8012 SMPTE Journal, vol. 92, No. 5, May 1983, pp. 571–576.

Campbell, Optimal Decision Making in a Business Simulation, System Sciences, 1989 Annual Hawaii International Conference, vol. III, pp. 822–831.

Dawson, Compression on the Fast Track, Cablevision, Apr. 22, 1991, pp. 22–30.

Martial et al., An Interactive Planner for Open Systems, Proceedings of the 4th Conference on Artificial Intelligence, Mar. 1988, pp. 293–298.

(List continued on next page.)

*Primary Examiner*—Stephen S. Hong
*Attorney, Agent, or Firm*—Dorsey & Whitney LLP

[57] ABSTRACT

The present invention is an interactive computer system which may operate on a computer network. Subscribers interact with a fully interactive programthrough the use of input devices and a personal computer or a television. The multiple video/audio datastreams may be received from a broadcast transmission source or may be resident in local or external storage. In response to user inputs, a personalized graphics, video and/or audio presentation is provided to the user either immediately or at a later time. If not presented immediately, the interactive computer system utilizes "trigger points" to determine when to enable multiple multimedia segments during the show. The CPU uses embedded or stored authoring commands for integrating the various multimedia elements. The interactive multimedia computer enables seamless flicker-free switching from one signal to another on the same or different channels.

19 Claims, 13 Drawing Sheets

U.S. PATENT DOCUMENTS

| | | | |
|---|---|---|---|
| 2,826,828 | 3/1958 | Hamilton | 35/9 |
| 2,908,767 | 10/1959 | Fritzinger | 179/100.2 |
| 2,921,385 | 1/1960 | Hamilton | 35/9 |
| 3,008,000 | 11/1961 | Morchand | 348/485 |
| 3,020,360 | 2/1962 | Gratian et al. | 179/100.2 |
| 3,194,895 | 7/1965 | Treadwell | 179/100.2 |
| 3,221,098 | 11/1965 | Feldman et al. | 178/5.8 |
| 3,245,157 | 4/1966 | Laviana | 35/9 |
| 3,255,536 | 6/1966 | Livingston | 35/9 |
| 3,273,260 | 9/1966 | Walker | 35/9 |
| 3,284,923 | 11/1966 | Leslie | 35/8 |
| 3,343,280 | 9/1967 | Tolnai | 35/35 |
| 3,366,731 | 1/1968 | Wallerstein | 178/6 |
| 3,387,084 | 6/1968 | Hine et al. | 178/6.8 |
| 3,440,342 | 4/1969 | Beltrami | 178/6.8 |
| 3,477,144 | 11/1969 | Stillit | 35/9 |
| 3,484,950 | 12/1969 | Serrell et al. | 35/9 |
| 3,485,946 | 12/1969 | Jackson et al. | 178/6 |
| 3,538,621 | 11/1970 | Mayeda | 35/9 |
| 3,936,595 | 2/1976 | Yanagimachi et al. | 348/24 |
| 3,947,972 | 4/1976 | Freeman | 434/321 |
| 3,988,528 | 10/1976 | Yanagimachi et al. | 348/24 |
| 4,034,990 | 7/1977 | Baer | 463/31 |
| 4,264,924 | 4/1981 | Freeman | 348/11 |
| 4,264,925 | 4/1981 | Freeman et al. | 348/11 |
| 4,290,142 | 9/1981 | Schnee et al. | 455/3.1 |
| 4,305,131 | 12/1981 | Best | 345/327 |
| 4,333,152 | 6/1982 | Best | 345/327 |
| 4,361,730 | 11/1982 | Barber et al. | 348/14 |
| 4,422,105 | 12/1983 | Rodesch et al. | 385/83 |
| 4,507,680 | 3/1985 | Freeman | 348/10 |
| 4,516,156 | 5/1985 | Fabris et al. | 348/15 |
| 4,530,008 | 7/1985 | McVoy | 380/23 |
| 4,536,791 | 8/1985 | Campbell et al. | 380/10 |
| 4,573,072 | 2/1986 | Freeman | 348/10 |
| 4,602,279 | 7/1986 | Freeman | 348/10 |
| 4,635,132 | 1/1987 | Nakamura | 348/296 |
| 4,644,515 | 2/1987 | Allebest et al. | 369/32 |
| 4,694,490 | 9/1987 | Harvey et al. | 380/20 |
| 4,701,896 | 10/1987 | Allebest et al. | 369/32 |
| 4,704,725 | 11/1987 | Harvey et al. | 380/19 |
| 4,750,036 | 6/1988 | Martinez | 348/358 |
| 4,763,317 | 8/1988 | Lehman et al. | 370/358 |
| 4,768,087 | 8/1988 | Taub et al. | 348/3 |
| 4,786,967 | 11/1988 | Smith, III et al. | 348/485 |
| 4,807,031 | 2/1989 | Broughton et al. | 348/460 |
| 4,839,743 | 6/1989 | Best et al. | 386/318 |
| 4,846,693 | 7/1989 | Baer | 434/308 |
| 4,847,690 | 7/1989 | Perkins | 348/483 |
| 4,847,700 | 7/1989 | Freeman | 386/99 |
| 4,855,827 | 8/1989 | Best | 348/485 |
| 4,862,268 | 8/1989 | Campbell et al. | 348/463 |
| 4,875,096 | 10/1989 | Baer et al. | 348/485 |
| 4,924,303 | 5/1990 | Brandon et al. | 348/7 |
| 4,926,255 | 5/1990 | Von Kohorn | 348/13 |
| 4,965,825 | 10/1990 | Harvey et al. | 380/9 |
| 4,975,771 | 12/1990 | Kassatly | 348/469 |
| 4,987,486 | 1/1991 | Johnson et al. | 348/10 |
| 5,001,554 | 3/1991 | Johnson et al. | 348/10 |
| 5,010,500 | 4/1991 | Makkuni et al. | 348/358 |
| 5,014,125 | 5/1991 | Pocock et al. | 348/7 |
| 5,033,969 | 7/1991 | Kamimura | 434/322 |
| 5,034,807 | 7/1991 | Von Kohorn | 348/13 |
| 5,051,822 | 9/1991 | Rhoades | 463/25 |
| 5,093,718 | 3/1992 | Hoarty et al. | 348/7 |
| 5,109,414 | 4/1992 | Harvey et al. | 380/9 |
| 5,109,482 | 4/1992 | Bohrman | 395/328 |
| 5,157,491 | 10/1992 | Kassatly | 348/15 |
| 5,174,759 | 12/1992 | Preston et al. | 434/317 |
| 5,176,520 | 1/1993 | Hamilton | 434/350 |
| 5,177,604 | 1/1993 | Martinez | 348/13 |
| 5,181,107 | 1/1993 | Rhoades | 348/13 |
| 5,220,420 | 6/1993 | Hoarty et al. | 348/12 |
| 5,227,874 | 7/1993 | Von Kohorn | 705/10 |
| 5,236,199 | 8/1993 | Thompson, Jr. | 463/41 |
| 5,247,347 | 9/1993 | Litteral et al. | 348/7 |
| 5,261,820 | 11/1993 | Slye et al. | 463/1 |
| 5,318,450 | 6/1994 | Carver | 434/336 |
| 5,388,197 | 2/1995 | Rayner | 395/328 |
| 5,454,722 | 10/1995 | Holland et al. | 434/322 |
| 5,455,910 | 10/1995 | Johnson et al. | 395/806 |
| 5,467,288 | 11/1995 | Fasciano et al. | 364/514 R |
| 5,541,662 | 7/1996 | Adams | 348/460 |
| 5,557,724 | 9/1996 | Sampat et al. | 396/327 |
| 5,585,858 | 12/1996 | Harper et al. | 348/485 |
| 5,594,492 | 1/1997 | O'Callaghan et al. | 348/10 |
| 5,594,935 | 1/1997 | Reber et al. | 455/2 |
| 5,724,091 | 3/1998 | Freeman et al. | 348/13 |

OTHER PUBLICATIONS

Gault, Turning Cold Box Into Interactive TV, Crain's New York Business, Jul. 15, 1991, p. 17.

Tsuruta et al., A Knowledge Based Interactive Train Scheduling System Aiming at Large Scale Complex Planning Expert Systems, International Workshop on Artificial Intelligence for Industrial Applications, 1988, pp. 490–495.

Gilder, Now or Never, Forbes, Oct. 14, 1991, pp. 188–198.

Kim, First All–Digital HDTV Developed by Video Cipher, Multichannel News, Jun. 11, 1990, p. 35.

Kim, ATC: Technical Tidal Wave to Engulf Cable Industry, Multichannel News, Aug. 13, 1990, pp. 33–34.

Kim, Jerrold Offers Cable Digital Compression, Multichannel News, Mar. 11, 1991, p. 6.

Kim, Test Equipment for Digital Still a Puzzle, Multichannel News, May 27, 1991, p. 24.

Powell, Digitizing TV Into Obsolescence, New York Times, Oct. 20, 1991.

Waterset al., Talking Back to the Tube, Newsweek, Dec. 3, 1990, pp. 56–57.

Will it Revolutionize HDTV?, Broadcasting, Jun. 4, 1990, pp. 33–34.

Video Storage In Digital Transmission, Specs Technology, Cable Television Laboratories, vol. 3, No. 7, Sep. 1991, pp. 1–6.

INTERACTIVE COMPUTER SYSTEM FOR PROVIDING AN INTERACTIVE PRESENTATION WITH PERSONALIZED VIDEO, AUDIO AND GRAPHICS RESPONSES FOR MULTIPLE VIEWERS

RELATED APPLICATIONS

This is a continuation-in-part of application Ser. No. 08/443,607, filed May 18, 1995 U.S. Pat. No. 5,724,091, which is continuation-in-part of application Ser. No. 08/166,608, filed Dec. 13, 1993, now abandoned which in turn is a continuation of application Ser. No. 07/797,298, filed Nov. 25, 1991, now abandoned. The interactive television program is of a type disclosed in U.S. Pat. Nos. 5,585,858, 4,847,700, 4,507,680, 4,573,072, 3,947,792, 4,602,279, 4,264,925, and 4,264,924.

BACKGROUND OF THE INVENTION

Interactive video and audio presentation systems are currently being introduced into the entertainment and educational industries. A prominent interactive technology that has been applied successfully in these industries is based on providing interactivity in a one-way system through the provision of multiple parallel channels of information. For example, commonly owned Freeman et al. patents, U.S. Pat. Nos. 4,264,925 and 4,264,924, which provide both audio and video interactivity, disclose interactive television systems where switching among multiple broadcast or cable channels based on viewer selections provides an interactive capability.

These systems have been enhanced to include memory functions using computer logic and memory, where selection of system responses played to the viewer are based on the processing and storage of subscriber responses, as disclosed in Freeman patent, U.S. Pat. No. 4,507,680.

The benefits of providing interactivity through the use of different audio responses is disclosed in Freeman, U.S. Pat. Nos. 4,847,698, 4,847,699 and 4,847,700. These television systems provide a common video signal accompanied by several synchronized audio channels to provide content related user selectable responses. The audio signals produce different audio responses, and in some cases, these are syllable synched to a first audio script and to the video signal (such as to a person or character on a display), providing the perception that the person's or character's mouth movements match the spoken words.

Interactivity is brought to the classroom in the Freeman U.S. patent application Ser. No. 08/228,355. The distance learning system claimed in this application enhances the classroom educational experience through an innovative use of interactive technology over transmission independent media. When an instructor, either broadcast live on video or displayed from videotape, asks a question, each and every student responds, preferably by entering a response on a remote handset, and each student immediately receives a distinct and substantive audio response to his or her unique selection. The individualization of audio response from the interactive program is a major aspect of the invention.

Individualization of audio is brought to the home based on the technology disclosed in Freeman U.S. patent application Ser. No. 08/228,355. This system provides a program that can be watched on any conventional television set or multimedia computer as a normal program. But if the viewer has a special interactive program box connected to the television, he or she can experience a fully functional interactive program. Each interactive viewer enjoys personalized audio responses and video graphics overlayed on the screen. The interactive program can be provided to television sets or to computers by cable, direct broadcast satellite, television broadcast or other transmission means, and can be analog or digital. Unlike previous interactive systems, this application covers a system that subtly introduces the interactive responses to the viewer throughout the program. This enhanced interactivity is provided through the use of "trigger points" spread throughout the program. Trigger points occur at designated times and result in the program content being altered to present individual attention to the particular viewer.

However, what is needed is an interactive personalization provided via an interactive multimedia computer. Furthermore, a system is needed that provides not only the ability to branch amongst parallel transmitted datastreams, but also, the capability to seamlessly integrate input from other media, such as CD-ROMs and laser disks, into the presentation. What is needed is a computer-based system for branching between a variety of inputs during the same interactive session including full-motion video, computer graphics, digital video overlays and audio.

SUMMARY OF THE INVENTION

The ACTV system is based upon branches which occur in the course of the full-motion video. Branches may be to other full-motion video segments, to graphics which are integrated into the video, and/or to audio segments which are integrated into the show.

Sometimes, the ACTV system will act upon the user's response immediately; other times, it will utilize ACTV's unique "trigger point" concept to act upon the response later. ACTV's technology enables the computer to "remember" the user's responses and integrate them into the video and audio at a later point. Regardless of whether the action is taken as a result of the user's response immediately or later, it is done seamlessly.

ACTV's television technology provides the capability to seamlessly branch among multiple video and audio sources. ACTV's computer technology provides the ability to seamlessly branch not only among the multiple video and audio channels, but also to seamlessly integrate input from other media, such as CD-ROM's, laser disks, hard disks, and remote servers, connected via the Internet or another network, into the show.

During a television-based ACTV interactive session, the system will branch among either multiple television channels or multiple audio sources, depending upon the type of implementation. By contrast, during a computer-based interactive session, branches may be among a variety of inputs from a variety of different sources during the same interactive session: full-motion video, computer graphics and audio. Since the computer provides the capability to process data from various multimedia inputs simultaneously, ACTV technology can integrate seamless switching of full-motion video, graphics and audio from various sources simultaneously during the show. The computer-based ACTV implementation is therefore much more flexible than the television-based ACTV implementation.

It also provides the user with the capability to interact with the show utilizing a variety of input devices. Not only can the user interact with the show by pressing a multiple-choice button, but the interaction can also take the form of entry via the range of multi-sensory devices available on the computer, including mouse entry, full-motion pen entry and touch screens. This integration of various input and storage devices is particularly valuable in an educational environment, since it provides students with the ability to participate in their lessons in a variety of ways. The computer can both store the interactions for future reference and also transmit them to the teacher, via either a computer network or, in a distance learning setting, via a telephone network.

An ACTV interactive session can integrate full-motion video with user input at the same time. For example, the full-motion video may be playing on the screen, while the user is drawing a diagram in a corner of the screen. Thus, the video and audio may provide real-time input which the user is applying during the session on the same computer monitor.

PREFERRED EMBODIMENT

Figure 1:
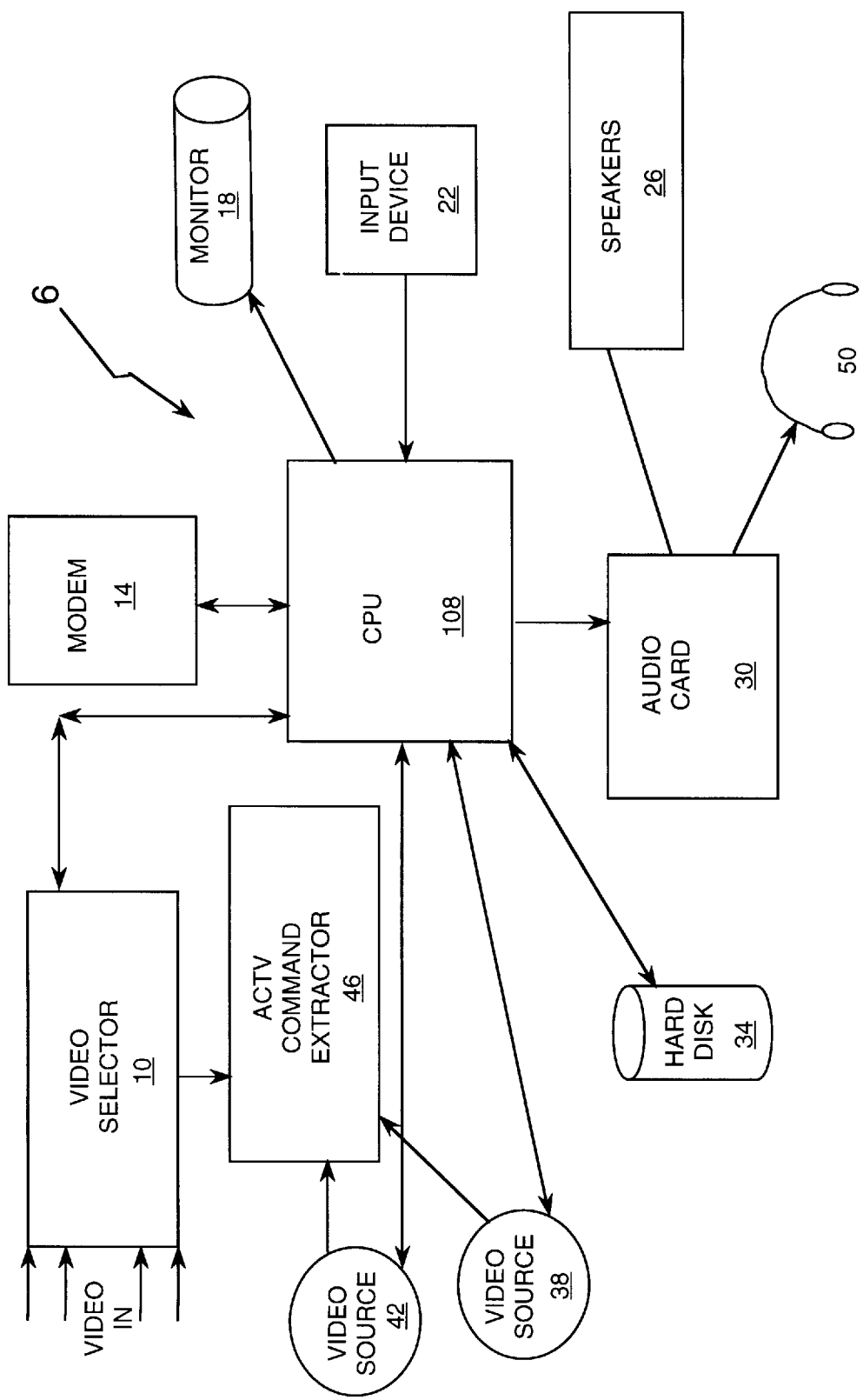
FIG. 1 is a diagram of an interactive computer workstation, receiving inputs from television broadcasts and/or local storage devices.

As shown in FIG. 1, the present invention is a computer based system for receiving a fully interactive program, allowing subscribers to interact with the program through the use of a keypad and personal computer. Alternatively, the multiple video/audio datastreams may be received from a broadcast transmission source or may be resident in local or external storage including CD ROM, video datatape, etc., as discussed below.

The interactive computer, 6 uses an interactive program delivery system with any transmission means including satellite, cable, wire or television broadcast to deliver the interactive program (hereinafter "composite interactive program") from a centralized location, or operations center, for distribution to subscribers in their homes. The program may be broadcast live from the operations center. For example, live sporting events with added interactive elements can be broadcast from the operations center. Such live interactive elements could be different camera angles, slow motion video, etc. Alternatively, the program can be produced off-line and stored in a program storage means at the operations center. Furthermore, the program can be produced and stored locally at the remote site on CD ROM or some other transferrable storage device such as digital or audio videotape, or laser disk.

An interactive presentation can comprise branching amongst full motion video, computer graphics and audio, with the interactive elements either received over a transmission media or stored locally, or both, all within the same show. As shown in FIG. 1, the workstation can branch among video segments from television broadcasts, local video servers 38, 42 (such as CD-ROMs, laser disks and tape players), still images and audio segments from the preceding media, as well as those stored digitally on hard disks 34, and segments obtained over networks such as the Internet.

The present invention, as shown in FIG. 1, is a system for processing on a computer a fully interactive program allowing users to interact with the program through a computer input device 22 connected to a standard computer system 6, comprising a CPU 108, hard disk 34, audio card 30 and monitor 18. The interactive multimedia computer 6 resides in the home of the subscriber or elsewhere, such as at a cable headend, as described below. If at the home, the interactive computer, 6 is usually located near the subscribers' television, if connected to the television set. Preferably, any of the multimedia computer embodiments, discussed below, comprise a video demodulator board, a keypad for entering subscriber selections, a data extractor board 46 (for extracting data from the vertical blanking interval from the video signal(s), temporary and permanent data storage, a modem 14, and a processor 108.

Figure 2:
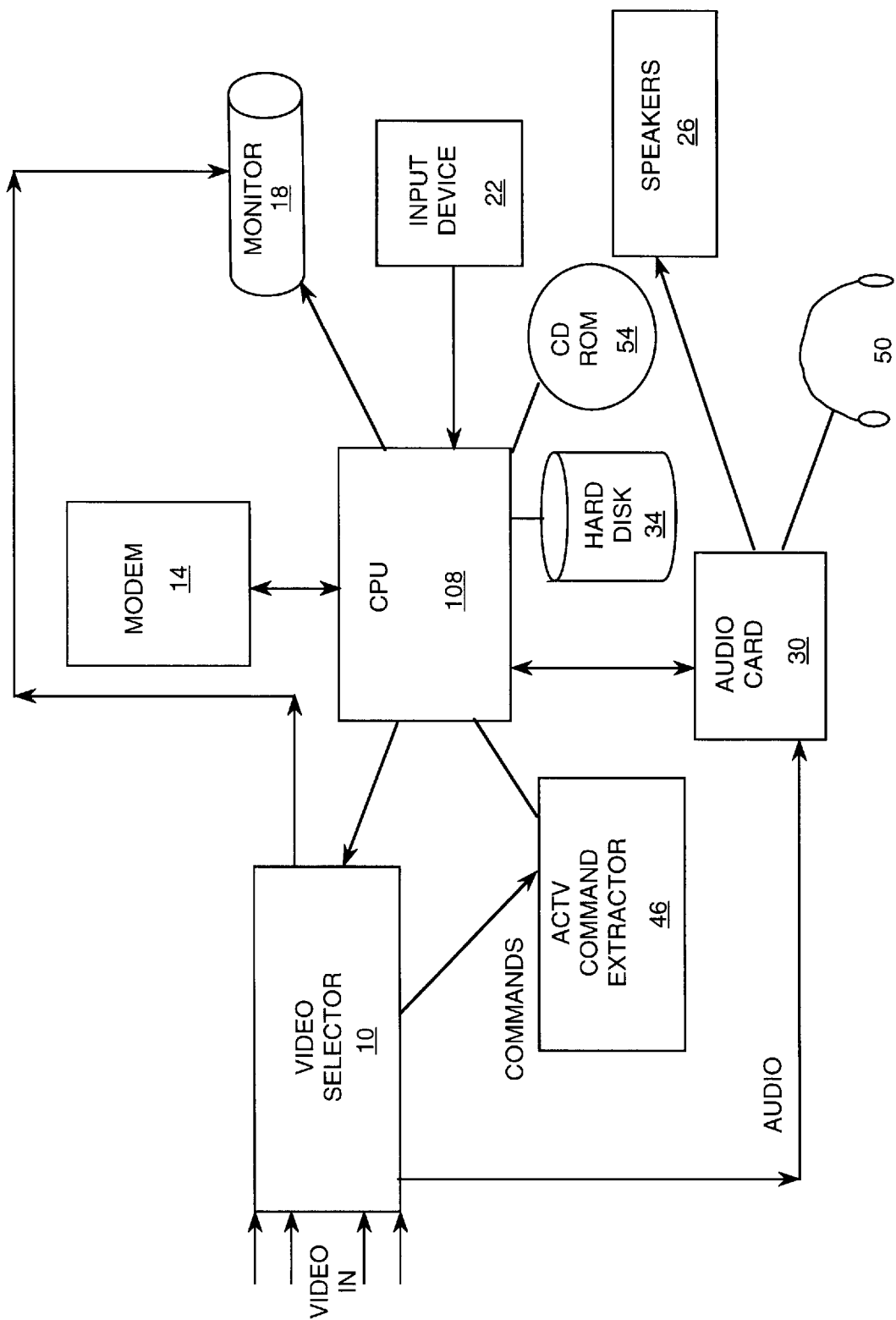
FIG. 2 is a diagram of an interactive computer workstation which receives its input primarily from television broadcasts.

Broadcast television is received by the video selector 10, which selects among various television channels to capture a video signal to be displayed on the computer monitor 18. Multiple television channels may be received. FIG. 2 shows an interactive computer workstation configuration which receives its input primarily from television broadcasts. With the technology of the present invention, seamless branching is provided among these television channels.

Figure 3:
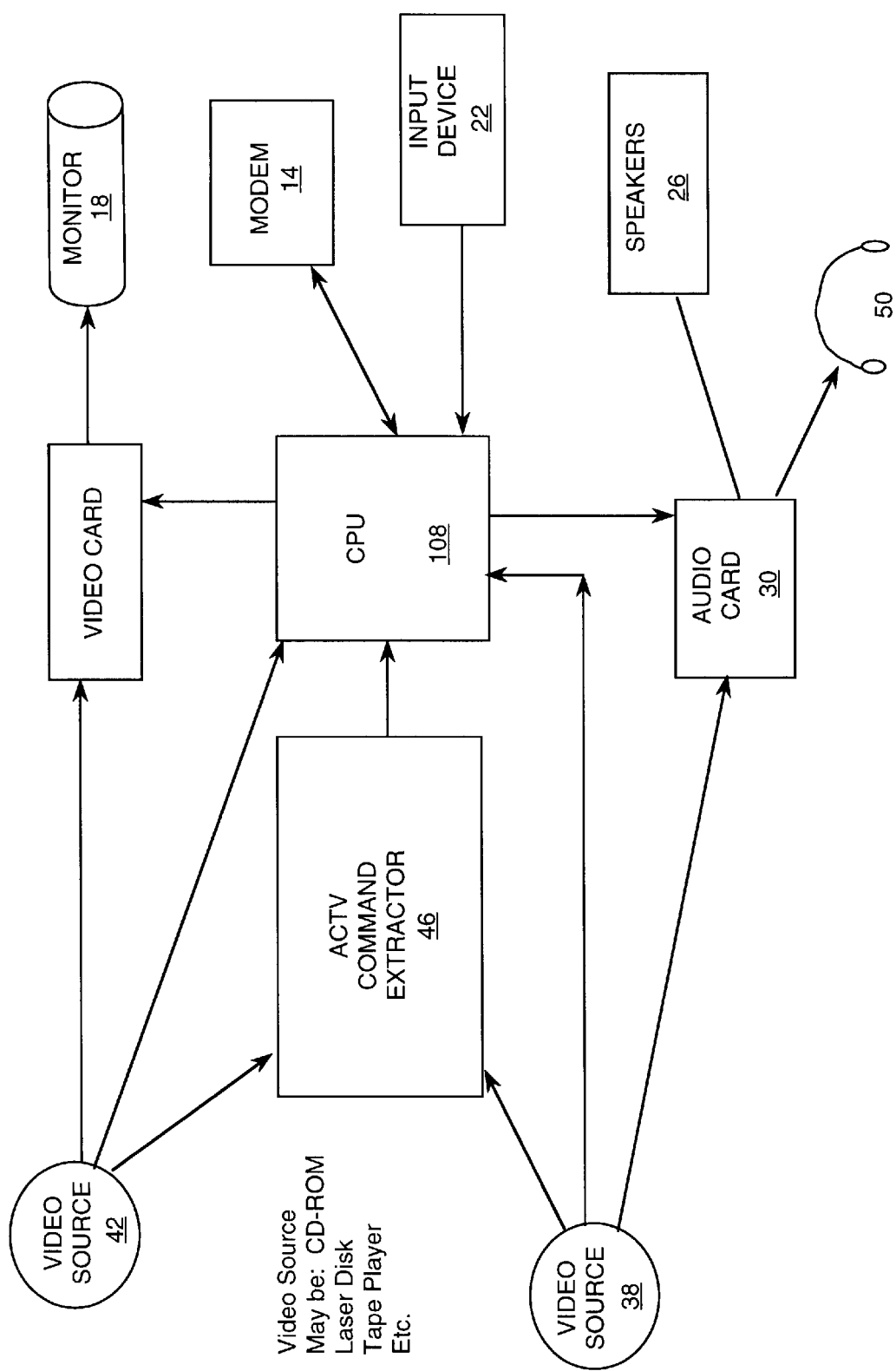
FIG. 3 is a diagram of an interactive computer workstation which receives its interactive programs entirely from local storage, rather than television broadcasts.

In the preferred embodiment, interactive programming is also stored on Video Source devices 38, 42, as shown in FIGS. 1 and 3. The Video Sources 38, 42 may be any local storage device which is accessible by the computer, including CD-ROMs, laser disks, VCR's and tape players. While FIGS. 1 and 3 show only two video sources, there may be any number of such devices.

When CD-ROM 54 is employed in the present invention, it is a component of a unique interactive experience. The present invention utilizes CD-ROM 54 as one of the multiple input devices. Since branching is always seamless in the preferred embodiment, the computer 6 may receive input from at least two devices, regardless of whether these sources are random access. This is necessary to avoid delays during search periods. While one device is playing the video, the other searches for a new branch. When the second device finds the segment for output display, the other input device searches for a new branch. When the second device finds the segment to be shown, the branch occurs seamlessly. The apparatus and method for seamless branching among various video signals is described in the paragraphs below.

Segments of the interactive program may also be stored on the computer's hard disk 34. The segments stored on the hard disk, 34 are usually computer graphics, still images or audio segments, which are integrated into the presentation. The format for storage on the hard disk 34 is digital. Any storage device may, however, store any combination of full-motion video, still images, graphics and audio segments.

As shown in FIGS. 1–3, the interactive commands are extracted from the program by the Command Extractor 46. Alternatively, these commands may be stored on an auxiliary storage device such as the hard disk 34.

The commands are processed by the computer's Central Processing Unit (CPU) 108, shown in FIGS. 1–3. The computer may be an IBM Personal Computer (PC)—Compatible, an Apple computer or any other type of standard computer workstation.

The CPU 108 determines what video to display and audio to play based upon the interactive commands which it receives. Based upon the commands, it plays the appropriate input from its input devices, which are the Video Selector 10, Video Sources 38, 42 and Hard Disk 34. Audio is received and processed by the Audio Card 30 which sends audio to Speakers 26 and/or headphones 50 as shown in FIGS. 1–3.

The user interacts with the program through the Input Device 22. This device may be a customized keypad, a standard computer keyboard, a mouse to "point and click" at selections and also to draw pictures, a touch screen (enabling the user to make a selection by pointing at the screen), a pen-based input device (for selecting options or draw pictures), a voice recognition device or any other computer input device well known in the art. Furthermore, multiple input devices may be accommodated by the system.

Regardless of the type of input device 22, user inputs can be utilized by the present invention immediately, or at a later time, to result in personalized graphics, video and/or audio presentation. For example, the present invention utilizes "trigger points," as described below, to enable subsequent branches among multimedia segments during the show. Additionally, more substantive user input, such as pictures and text, may be integrated into the interactive presentation. These types of user input are particularly useful in computer-aided learning applications, since they enable students to participate in lessons utilizing various media. The interactive computer 6 provides the framework to easily integrate the student's multimedia input into the session and to transmit the multimedia input to other students and teachers, via computer network and/or television broadcast.

Figure 4:
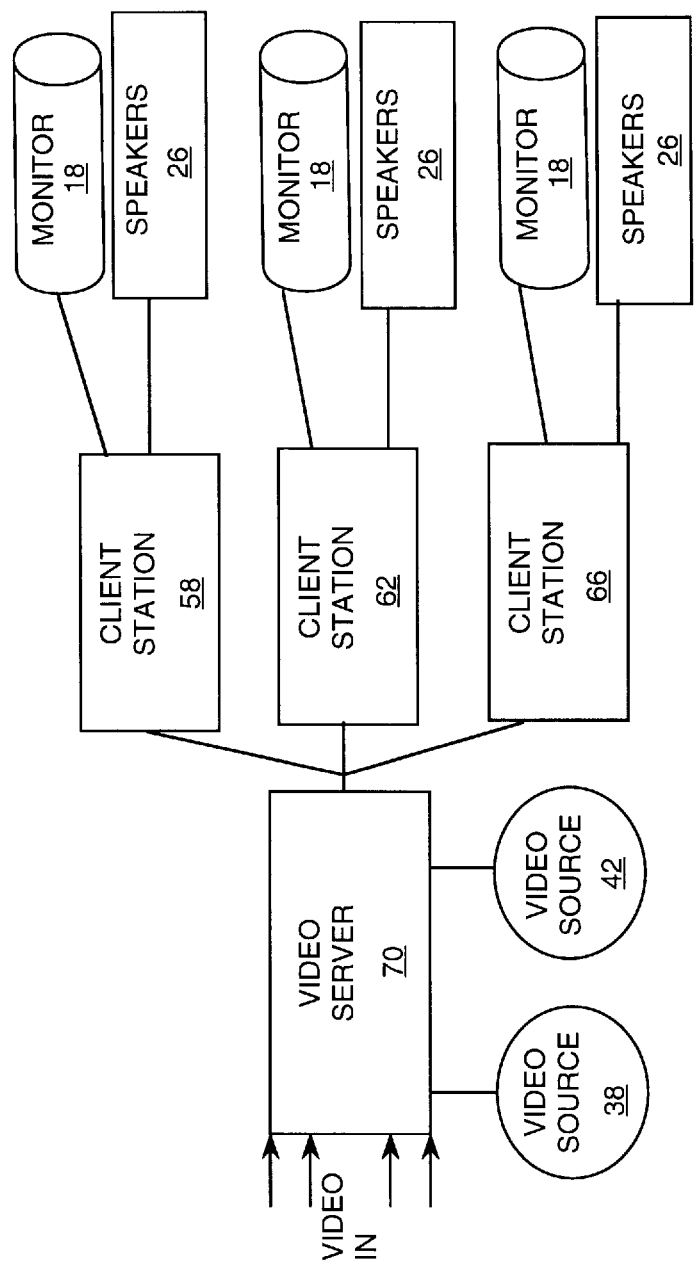
FIG. 4 is a diagram of an interactive network for interactive processing.

As shown in FIG. 4, the interactive system of the present invention may operate on a computer network. In this configuration, the program is processed by the Video Server 70. The programs are sent over the network to the Client Stations 58, 62, 66. Any number of client stations may be supported. The configuration of each client station is preferably the interactive workstation as shown in FIG. 3.

The control for integrating the various multimedia elements is provided by the ACTV authoring language, a unique set of interactive commands to facilitate the interactive process. These commands may either be embedded into data portions of full-motion video segments or may reside separately on a storage medium such as a Winchester disk. When the commands are embedded within the full-motion video (for example, within the vertical blanking interval), the interactions occur as soon as the computer completes the recognition of a command group. When the commands are stored separately from the video segments in a digital segment, the timing of their execution is based upon "trigger points." These trigger points are time points at which the interactions are to occur, as explained in more detail below.

Figure 5:
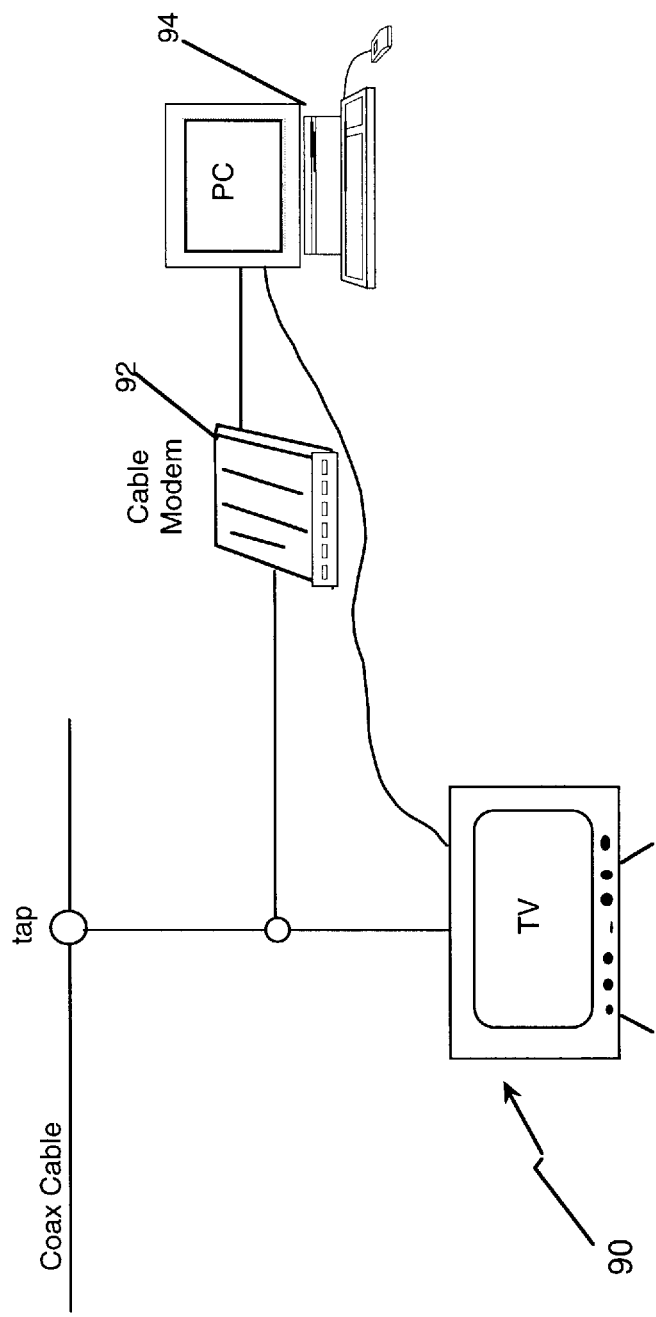
FIG. 5 is a diagram of an interactive computer system, receiving inputs from a multichannel cable transmission and showing outputs via a conventional television monitor.

The user can view the interactive program either directly using the television set 90 or via the computer 94 screen as shown in FIG. 5. FIG. 5 is a diagram of an interactive subscriber station, receiving inputs from a multichannel cable transmission and showing outputs via either the computer 94 screen or a conventional television 90 monitor. Cable channels can be shown in a window on the PC screen using conventional demodulator cards. In this embodiment, a cable set top box receives the plurality of analog or digital video/audio signals from the multichannel cable. The interactive multimedia computer 94 also receives the video/audio signals from the multichannel cable and extracts the data codes, preferably embedded in the vertical blanking interval of the video signal(s). The interactive computer 94 detector detects and extracts data codes embedded in the data stream. These codes are preferably sent to RAM memory and interpreted by the main processor. Personalized audio and/or video selection occurs by the main processor sending a branching command to the cable set top box. The cable set top box processor interprets the command and seamlessly branches to the selected video.

In the embodiment of FIG. 5, the subscriber can receive typical conventional video analog programming from a cable headend. Cable systems also may be used to convey digital data via a system such as the High-Speed Cable Data Service (HSCDS). In a digital system, the subscriber stations may receive programming from content servers or Internet Protocol (IP) routers. Content servers are typically a combination computer and data storage system that stores various types of content from information source providers. These providers might provide anything ranging from video games, distance learning applications, interactive applications, home shopping applications, online magazines and newspapers, databases, and typical network and cable programming. The IP router, on the other hand, formats, switches, and controls the flow of digital data traffic between the cable network and either the public switched telephone network (PSTN), the Internet, or commercial on-line information services, such as CompuServe and America Online. A headend modem modulates the digital data generated by the IP router onto an analog carrier signal suitable for transmission downstream to the subscriber. A typical downstream modulation scheme is 64 Quadrature Amplitude Modulation (QAM).

Each downstream transmission reaches the subscriber's house, shown in FIG. 5, preferably through a tap and drop cable. The cable modem 92 demodulates the analog carrier and converts the data to a digital format readable by the user's PC 94. Alternatively, the cable modem can be replaced by an RF demodulator board in the PC, 94.

The programming content associated with the present invention may reside on either a headend-based or a remote content server or one of the storage devices, discussed above (either temporarily or permanently downloaded from the content server). Subscribers gain access to the interactive programming on the server via an online menu.

In this digital embodiment, one channel of digitally-compressed video content would require about 1.5 Mbps to deliver VCR-quality images to the PC 94, while four channels would require about 6 Mbps. Thus, the interactive system of the present invention fits within one 6 MHz channel. At the subscriber station, the interactive seamless system could be implemented in one of the interactive multimedia computers, described below.

Seamless Switching between Broadcast Multiple Video Streams

Preferably, the digital video signals are compressed (preferably via MPEG 2 or any other compression scheme) and multiplexed onto a standard NTSC signal. The circuitry in FIGS. 6–8 below could be implemented on a board and inserted into a standard personal computer (PC). A separate microprocessor on the interactive board is not necessary for this configuration since the standard multimedia PC processor performs the functions of the processor 108 shown in FIGS. 6–8.

Figure 6:
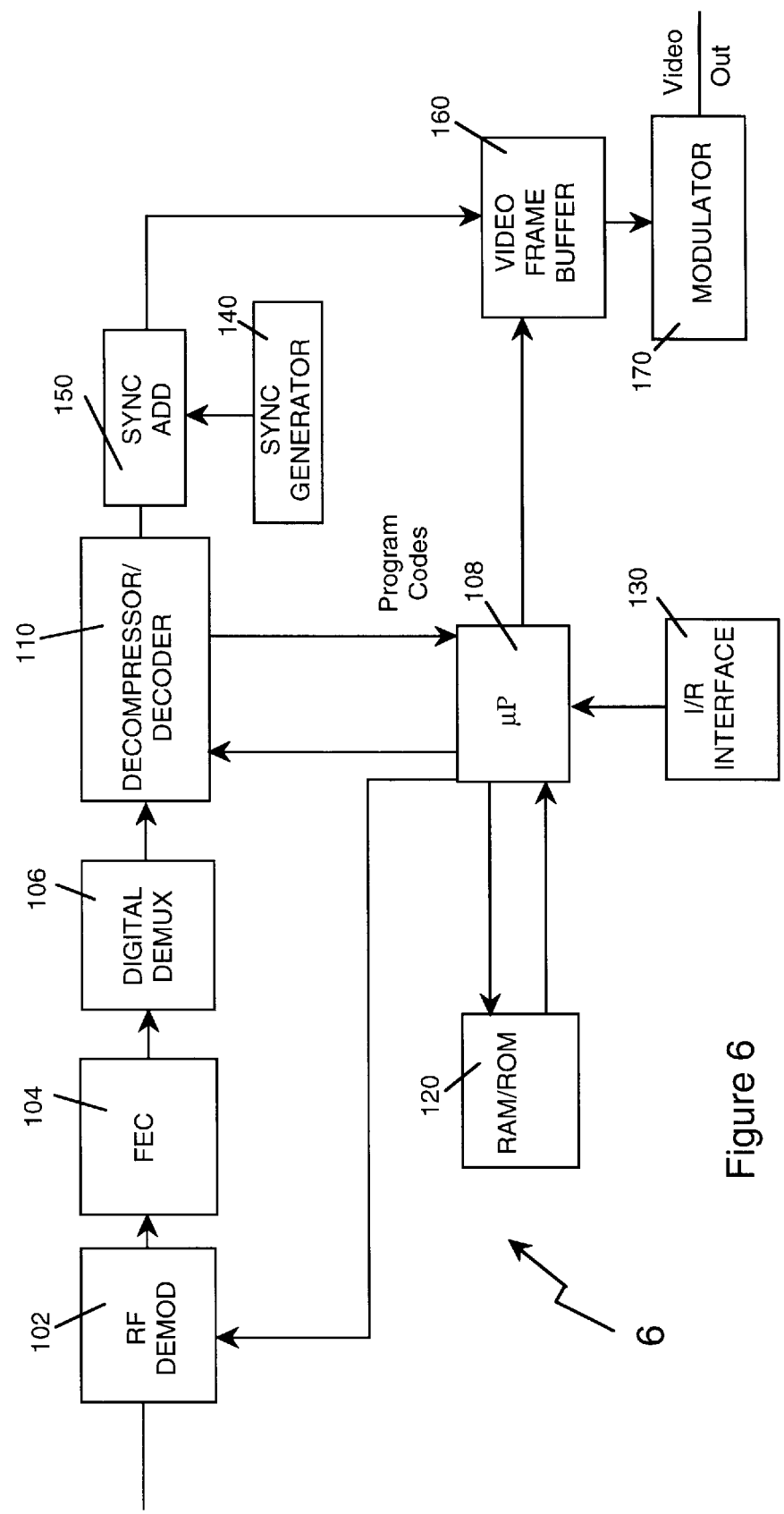
FIG. 6 is a block diagram of one interactive computer workstation embodiment to achieve seamless switching between video signals.
Figure 7:
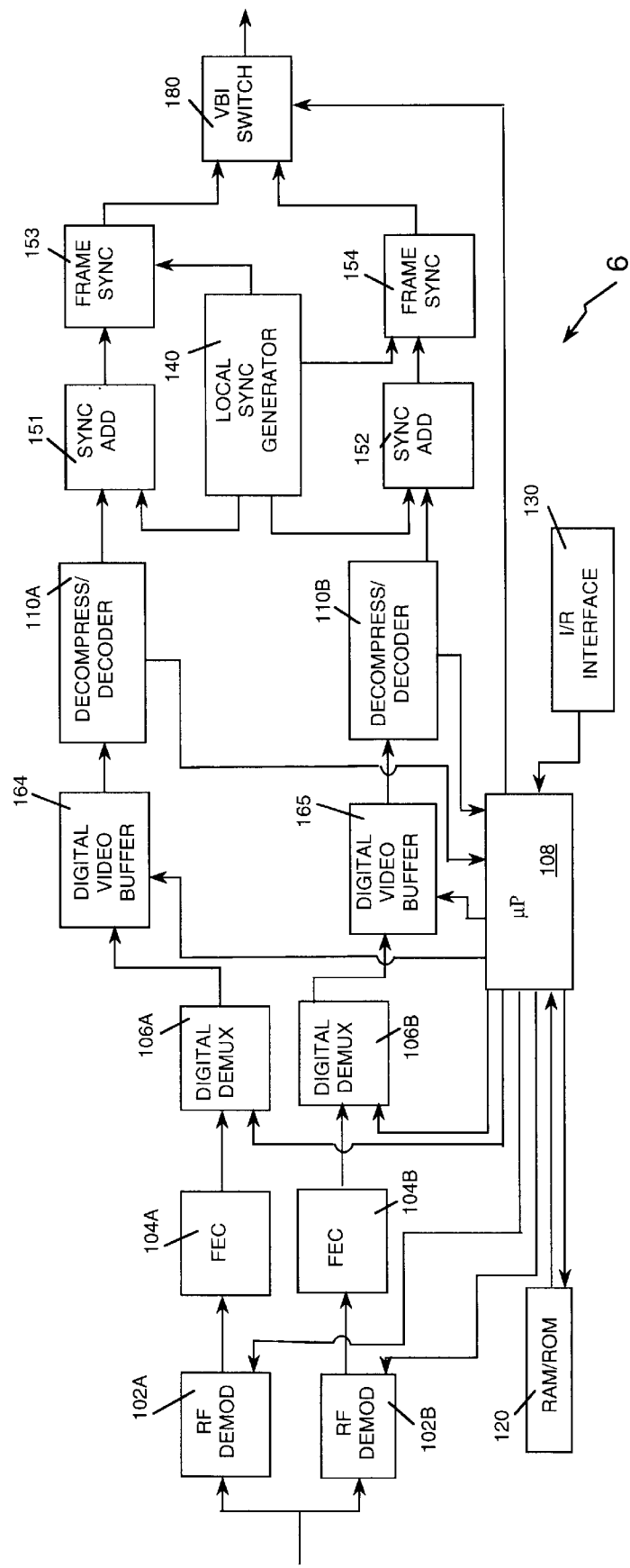
FIG. 7 is a block diagram showing an alternative interactive computer work station embodiment to achieve seamless switching between video signals.
Figure 8:
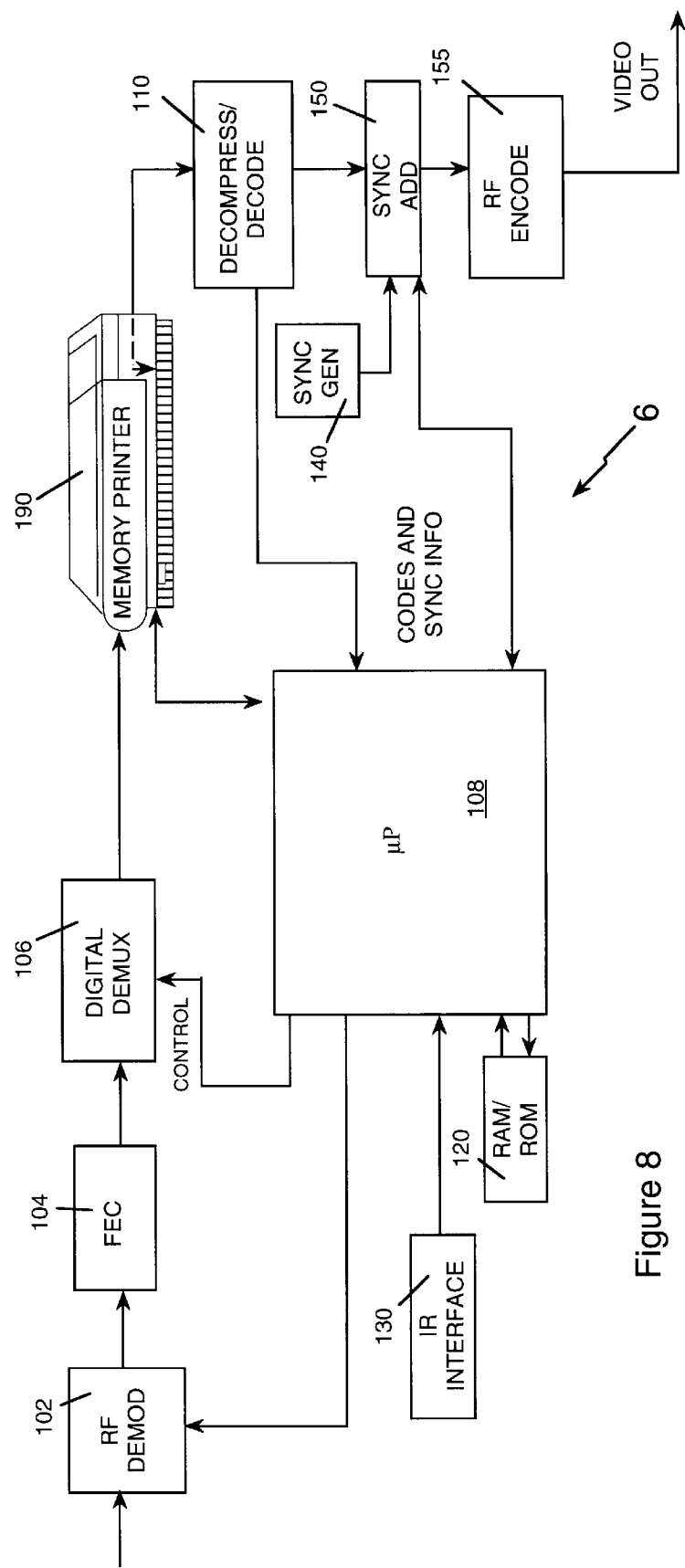
FIG. 8 is a block diagram showing another alternative to achieve seamless switching between video signals.

FIGS. 6–8 show preferred embodiments of the interactive multimedia computer 6 of the present invention to enable seamless flicker-free transparent switching between the digital video signals on the same channel or different channels. "Seamless" means that the switch from one video signal to another is user imperceptible. These embodiments may be connected to any transmission media or simply connected to the output of any stand-alone storage means (such as CD ROM) for the digitized multiplexed interactive program. Preferably, the interactive computer connects to a television or other display monitor. To provide this capability, only a digital demultiplexer, decompressor(s), frame buffer(s), and sync components are added to the conventional multimedia personal computer. These items, and any other components, may be connected to the PC processor and storage elements in the manner disclosed in FIGS. 6–8.

FIG. 6 shows an embodiment which allows for a seamless video switch between two or more separate digital video signals. As shown in FIG. 6, a CPU 108 is connected to an RF demodulator 102 and digital demultiplexer 106. The CPU 108 directs demodulation and demultiplexing of the proper channel and data stream to obtain the correct video signal. Preferably, switches occur at an "I" frame if MPEG2 compression is used. The proper channel is determined either by examination of the user's input from user interface 130 and/or any other information or criteria (such as personal profile information) stored in RAM/ROM 120. For example, the RAM/ROM 120 could store commands provided within the video signals as discussed in U.S. Pat. No. 4,602,279, and incorporated herein by reference. The user interface 130 may be an infrared, wireless, or wired receiver that receives information from a user interface unit.

The RF demodulator 102 is part of the receiver, and demodulates data from the broadcast channel directed by the processor 108. After the data stream is demodulated, it passes through a forward error correction circuit 104 into a digital demultiplexer 106. The demultiplexer 106 is controlled by microprocessor 108 to provide a specific video signal out of a number of video signals which may be located within the data stream on the demodulated broadcast channel. The demultiplexed video signal is then decompressed and decoded by decompressor/decoder 110. The video signal is synchronized by a sync add circuit 150 and a sync generator 140. The video signal is then buffered by a video buffer 160. The buffered video signal is modulated by a modulator 170 into a NTSC compatible signal.

By using a video frame buffer 160 and delaying the viewing of a given signal, enough time is allowed for the decompressor/decoder 110 to lock onto, decompress, convert to analog, and wait for the resultant vertical interval of a second video signal. For example, assume video signal A is currently being processed and transferred through the circuit shown in FIG. 6 and displayed. Based upon a user selection, the microprocessor 108 directs the digital demultiplexer 106 and RF demodulator 102 to switch to another video signal, video signal B. To accomplish this, the analog video from the first digital video signal, video signal A, complete with video sync, is fed into video frame buffer 160. This buffer 160 can hold the full video picture for "n" number of frames after which the signal is output to the display. In effect, a delayed video signal A is viewed "n" number of frames after the signal has been received. When the user selects a different video path by means of pressing a button on a keypad or entry by other means, the microprocessor 108 instructs the digital demultiplexer 106 to stop decoding signal A and lock onto signal B to begin decoding signal B instead of signal A.

While this is happening, even though the decompressor/decoder 110 is no longer decompressing video signal A, the display is still showing video signal A because it is being read from the buffer 160. As soon as decompressing and decoding occurs, the microprocessor 108 looks for the next vertical blanking interval (VBI) and instructs the video frame buffer 160 to switch to its input, rather than its buffered output at the occurrence of the VBI.

Since the RF demodulator 102, forward error corrector 104, digital demultiplexer 106, and decompressor/decoder 110 require a certain time period to decompress and decode the video signal B frame from its data stream, the size of the buffer 160 has to be large enough so that this processing can take place without interruption during the switching of the video signals. If desired, the system may continue to use the buffer 160 in anticipation of a future switch. By using the microprocessor 108 to manipulate the fill and empty rate of the buffer 160, the buffer 160 may be rapidly filled with video signal B frames and then after a period of time will be reset and ready to make another switch to another video in the same manner. The buffer 160 may also be reset by skipping frames or providing a delay between sequential frame outputs for a short time in order to fill the buffer. If a delay is used to maintain video signal or frame output while the buffer 160 is being filled a slight distortion may occur for a brief amount of time.

Because a first video signal is always displayed as the output of the buffer 160 after the delay, the buffered video masks the acquisition and decoding of a second video signal. As long as the buffer 160 is large enough to keep the first video running while the second video is being decompressed and decoded, a seamless switch will occur.

FIG. 7 shows an alternate, dual tuner embodiment for seamless switching between separate video signals. In this embodiment, the microprocessor 108 controls the selection of the RF channel that is demodulated by RF demodulators 102A, 102B. The demodulated data streams enter the forward error correctors 104A, 104B. At the output of the forward error correctors 104A, 104B, the data streams are transmitted to the input of the digital demultiplexers 106A, 106B.

As with the RF demodulators 102A, 102B, the digital demultiplexers 106A, 106B are controlled by the microprocessor 108. This configuration allows the microprocessor 108 to independently select two different individual time-multiplexed video signals on different channels and data streams. If all the video signals of an interactive program were contained on a single channel or data stream, it would only be necessary to have a single RF demodulator, forward error corrector, and digital demultiplexer serially connected and feeding into the two digital video buffers 164, 165.

Two data streams are provided from the digital demultiplexers 106A, 106B. One data stream carries video information pertaining to the video signal the user is currently viewing. The second data stream carries the video signal selected based on the user's previous and/or current interactive selections from the user interface, as determined by the microprocessor 108.

The digital information on each of the two streams is buffered in digital video buffers 164, 165. The buffered signals are then decompressed and converted into analog signals by decompressors/decoders 110A, 110B which include digital to analog converters. The decompressors 110A, 110B are preferably MPEG2 decoders.

A local sync generator 140 is connected to sync add 151, 152 and frame sync circuits 153, 154. Because both streams are synchronized based on signals from the same local sync generator 140, each stream becomes synchronized to the other. In particular, the signals on each stream are frame synchronized.

A vertical blanking interval (VBI) switch 180 is connected to the microprocessor 108 so that the input may be switched during the vertical blanking interval of the current stream, resulting in a seamless switch to the viewer.

The embodiment of FIG. 7 operates as follows. Based on user responses and control codes, it is assumed that the microprocessor 108 determines that a switch from video signal A to video signal C should be performed. RF demodulator 102A and digital demultiplexer 106A are processing the currently viewed video signal, video signal A, which is progressing through the upper branch components. A command is issued from the microprocessor 108 to the RF demodulator 102B commanding a switch to the channel and data stream on which video signal C is located. The microprocessor 108 also instructs the digital demultiplexer 106B to provide video signal C from the received data stream to digital video buffer 165.

At this point, the upper RF demodulator 102A and digital demultiplexer 106A are still independently receiving and processing video signal A, which continues through the upper branch of the circuit.

At a certain point, the digital decompressor/decoder 110B in the lower branch will begin filling up with video C frames. After the video signal C is decompressed and decoded, it is converted into analog. A local sync generator 140 inserts both local sync and frame sync to video signal C via sync add circuit 152 and frame sync circuit 154 in order to synchronize it with the currently displayed video signal A, which is still being provided from the upper digital video buffer 164. At the appropriate switch point, triggered by programming codes supplied with each video signal A and C, the microprocessor 108 directs the VBI switch 180 to switch in the vertical blanking interval from video A to video C, at which time video C will then seamlessly appear on the computer screen.

Digital video buffers 164, 165 may be used in the circuit of FIG. 7, but are optional. However, in an alternative embodiment the buffers, 164, 165 would be required to provide a seamless switch if the FIG. 7 circuit was modified to incorporate a single RF demodulator 102, single forward error corrector 104, and single digital demultiplexer 106 (as in FIG. 3), each with a single input and single output. In this alternative embodiment, the circuit cannot independently receive and demultiplex two data streams on different frequency channels. One buffer is used to store previously received video signals, while the other buffer quickly passes through the selected video signals.

Based on the same assumptions above, video signal A is progressing through the upper branch of the circuit and it is desired to switch to video signal C. However, in this alternative embodiment, the digital video buffer 164 is providing maximum buffering to video signal A.

Because it is desired to switch to video signal C, the microprocessor 108 directs the alternative circuit (containing a single RF receiver 102, single forward error corrector 104 and single digital demultiplexer 106 connected in serial), to receive and demultiplex the data stream on which video signal C is located, which may be different than that of video signal A. When video signal C is demultiplexed, the microprocessor 108 directs the digital video buffer 165 to provide minimum buffering of video signal C so that decompressor/decoder 110B may quickly decompress and decode the digital signals. After decompression and decoding, video signal C is synchronized with video signal A. At this time video signal A is read for display from digital video buffer 164. The upper digital video buffer 164 must be large enough to provide video frames for output during the time it takes the RF demodulator and digital demultiplexer to switch to video signal C and the time required for decompression, decoding, and synchronization of video signal C.

When video signal C is synchronized with video signal A, the microprocessor 108 directs VBI switch 180 to switch from video signal A to video signal C in the vertical blanking interval of video signal A, thereby providing a seamless and flicker-free switch.

At this time, digital video buffer 165 will begin to utilize maximum buffering by altering its fill/empty rate as described above with respect to the FIG. 7 embodiment. When adequate buffering is achieved, a switch to another video signal may be performed in the same manner as described above.

Another preferred embodiment is shown in FIG. 8. This embodiment also includes an RF demodulator 102, a forward error corrector 104, and a digital demultiplexer 106. However, the circuitry differs along the rest of the chain to the television set or monitor. In this embodiment, a memory 190 is incorporated and connected to the output of the demultiplexer 106 for storing the compressed composite digital video signal. The decompressor/decoder 110 is inserted at the output of the compressed memory 190. The decompressor/decoder 110 decompresses the digital signal, converts the signal to analog and forwards the analog signal to the RF encoder, 155 for transmission to the monitor. Once the composite compressed digital video signal is fed into the compressed memory 190, the microprocessor 108 directs a pointer to be placed somewhere along the compressed digital video signal. Based on the placement of the pointer, different frames and different segments of the composite digital video signal will be read from memory 190 for decompression and decoding.

The different video signals are distinguished from one another because they are labeled, preferably by headers. Assuming that video signal A has been selected for play on the monitor, the compressed digital memory 190 fills up with A frames. Assuming a switch to video signal C is desired, the microprocessor 108 directs the RF demodulator 102 and digital demultiplexer 106 to begin filling the compressed memory 190 with video C frames. The decoder pointer begins to move down. As soon as a sufficient number of C frames have entered the compressed memory, the pointer will then jump to the beginning of the C frames. The C frames are then output into the decompressor/decoder where the digital frames are converted into an analog signal.

The digital video is multiplexed in a series of easily identifiable packets. These packets may contain full compressed frames of video (I frames) or may include only the differences between full frames (B frames or P frames).

To be able to reconstruct the full video images, the decompressor/decoder 110 needs to have a minimum number of I, P and B frames. The decoder 110 needs only one I frame to decode an image. Conversely, two prior Anchor frames ("I's" and "P's") are necessary to decode B frames. In order to decode P frames, the decoder 110 only needs one Prior Anchor frame. When the microprocessor 108 instructs the digital demux 106 to start sending packets from a different data stream there is no way to be certain that the next packet will be an I packet needed for decoding the second video stream. To avoid a breakup of the video images, which would occur if the decompressor/decoder 110 suddenly started receiving packets unrelated to the stream it was decoding, the microprocessor 108 starts to fill up the memory 190 with video signal C packets until it is determined that a full sequence of I, B and P frames are available. The decoder, 110 should receive the last bit of the last B frame in a given, GOP (Group of Pictures) before the switch, in order to prevent glitches when decoding. Furthermore, the last B frame of the GOP must only be backward predicted, not forward predicted or bidirectional predicted. As soon as the valid sequence is in memory 190 the microprocessor 108 moves the memory read pointer to the start of a valid sequence of C video signal packets so that the decompressor/decoder 110 can successfully decode the C signals. This results in a seamless switch from video signal A to video signal C.

This embodiment requires a data channel for enabling a synchronous switch between a first video stream and a second video stream. This data channel comprises the ACTV codes which link together the different program elements and information segments on the different video signals. In addition, the data channel also comprises synchronization pulses and a time code to signify to the pointer the proper time to skip from a memory location representing one video signal to a memory location representing another video signal in order to enable a seamless switch.

The microprocessor 108 reads the data signal from the digital demultiplexer 106 and communicates pertinent data to the sync add circuit 150, which is connected to sync generator 140. The microprocessor 108 is then able to synchronously communicate with the memory 190.

The time code sent will identify the timing for one picture, as well as for multiple pictures, and will lock the different pictures together. This is done through the use of similar clocks at both the transmission end and the receiver. A time code is used in order to keep the two clocks at both the transmission and receive end synchronously connected to one another. Once the clocks at both ends are working synchronously, each of the multiplexed video streams must be synchronized to the clocks. In order to synchronize the multiplexed video stream to the clocks, each of the individual channels must be referenced to a common reference point and must be identified.

In the preferred embodiment, a packet header would be incorporated into the transport layer of the MPEG signal to identify the various channels. The packet header will also include information as to where to insert the vertical blanking interval. In MPEG, the vertical blanking interval is not transmitted from the headend. Therefore, the vertical blanking interval must be generated locally. The packet header eye will identify at what time the vertical blanking interval is in existence in order to effectuate a seamless switch between analog pictures.

In summary, the combination of clock and the information imbedded in either the transport layer of MPEG or in a separate packet on a separate data channel effectuates the linking between each video signal and a corresponding time point. The data channel also includes information designating when all the various video signals will be in synchronism with one another. It is at these points that the microprocessor 108 may direct the pointer to skip from one location to another location, at a time (such as during the VBI) when a seamless switch will result.

Trigger Points

Figure 9:
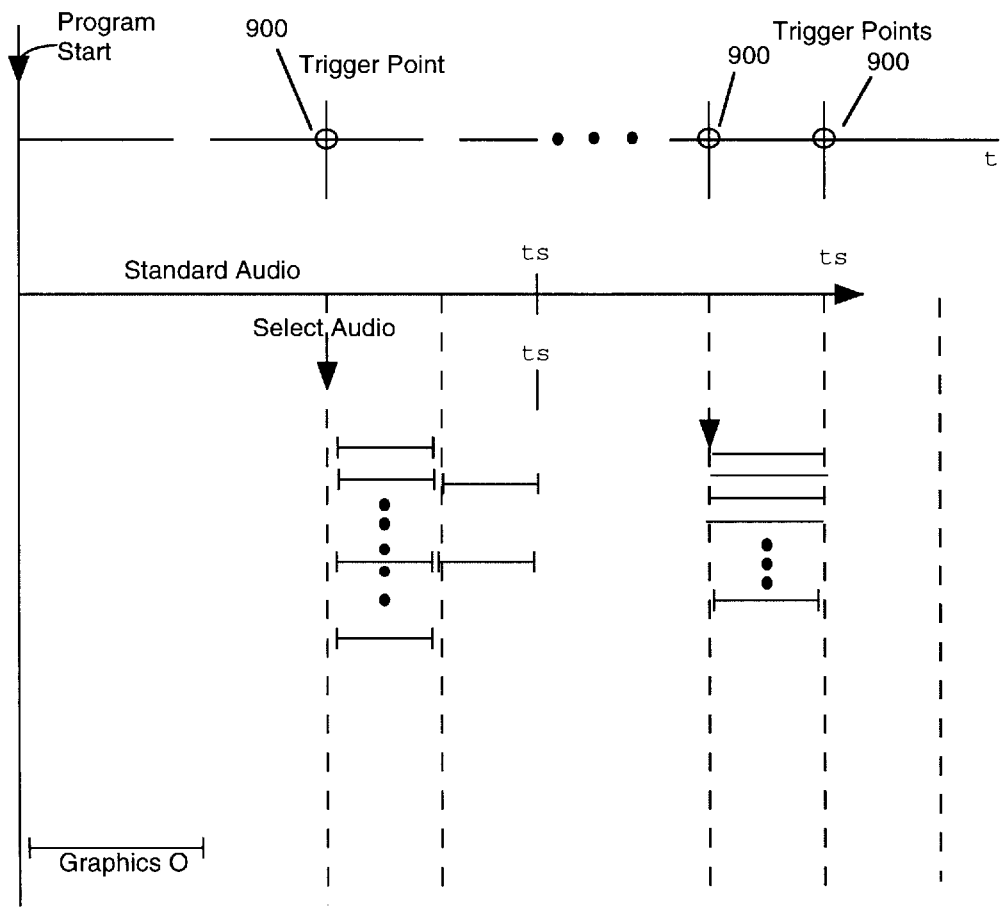
FIG. 9 is a time diagram showing a representation of trigger points and corresponding alternative audio, video or graphics segments, one of which is selected for presentation to the subscriber immediately after the execution of a trigger point function.

Interactivity is further enhanced in the interactive computer workstation embodiments through the application of trigger points 900 scattered at various predetermined times throughout the program, a timeline representation of which is shown in FIG. 9. The trigger points 900 correspond to times when interactive events are scheduled to take place. These interactive events could be the selection and playing of video, audio segments or the display of graphics. While the choice of particular video, audio or graphics is still dependent on viewer selections, the viewer selections in response to displayed graphical interrogatory messages are preferably made during a period at the onset of the program or when a viewer first tunes into the program. These viewer selections are then utilized as inputs to macros called up at later times during the program by the controller upon the occurrence of the trigger points, identified to the interactive computer by unique codes embedded in the video signal.

The trigger points correspond to the times when the conventional program content can be altered and personalized for those subscribers capable of receiving the interactive signal. The programmer can place the trigger points at any time throughout the program. Since the trigger points are unknown to the subscriber, the subscriber does not know when they will receive a personalized message. In other words, an interactive response can either immediately follow a corresponding user selection made to an interrogatory message or occur at a later time corresponding to a trigger point, or any combination of the two. Of course, timing of the interactive events should correspond to suitable times in the program where branching to interactive elements is sensible and does not clash with the program content of the conventional video still displayed on the television or other display monitor.

At the onset of a trigger point 900, the controller will select one of several possible audio (or video or graphic display) responses for presentation to the subscriber. As mentioned above and shown in FIG. 9, some of the responses may comprise a branch to either a video segment and/or audio segments.

In combination with the use of trigger points 900, the present invention allows for the viewer to select certain options at the onset of the program to suit the viewers' preferences. For example, if the program broadcast is a live sports event, at an early trigger point 900, the viewer could be queried as to whether the viewer would prefer to receive audio in English, Spanish, French, or perhaps hear the local announcer instead of the network announcer. Upon the viewer selection, the CPU directs a branch to the appropriate interactive segment.

Each trigger point is identified preferably through the broadcast of ACTV codes sent as part of the composite interactive program signal. The codes preferably include, at a minimum, the following information: (1) header identifying the occurrence of a trigger point; (2) function ID (e.g., selection of audio or graphics responses, etc.); and (3) corresponding interrogatory message(s). The first bit sequence simply identifies to the controller that a trigger point is about to occur. The function ID designates the macro or other set of executable instructions for the controller to read and interpret to obtain the desired result, e.g., a selected video and/or audio response.

Upon extraction of the codes by the data decoder, the CPU 108 reads and interprets the codes and calls from memory a particular user selection(s) designated by the trigger point codes. The user selections correspond to subscriber answers to a series of interrogatory messages preferably presented at the beginning of the program. After obtaining the appropriate user selection(s), the controller 108 reads and performs the executable instructions using the user selection(s) as input(s) in the macro algorithm. The result of the algorithm is either a selected video stream, audio and/or selected graphics response. The video/audio response can be called from memory if it is prestored, called from external data storage, or the controller can command the switch to branch to the particular video audio stream if the response is broadcast concurrently with the trigger point. After the selected video/audio response is played to the subscriber, the switch branches back to the standard program, shown at time $t_s$ in FIG. 9.

As mentioned above, a series of interrogatory messages are preferably presented when the subscriber begins watching the interactive program. These interrogatory messages can be presented in any one of three ways. First, the interrogatory messages can be presented as graphics displays overlaid by the interactive computer workstation onto a video signal, wherein the graphics data is sent in the vertical blanking interval of the composite interactive signal, or alternatively stored on the hard disk or external storage. Second, the interrogatory messages are presented as graphics displays as discussed above, except the graphics data comes from local storage, external data storage (e.g., CD ROM, cartridge, etc.), or a combination of data in the VBI and data called from either local or external data storage. Third, graphics data can be presented in the form of user templates stored at the interactive computer workstation.

User selections corresponding to answers to the n successive interrogatory messages are received by the remote interface at the beginning of the show, stored in memory and used throughout the show at the appropriate trigger points to subtlety change program content as the show progresses. Preferably, each interrogatory has a set of possible answers.

Next to each possible answer will be some identifier corresponding to a label on a key on the user interface. The subscriber depresses the key corresponding to their answer selection. This selection is decoded by the remove interface and controller, stored in memory, preferably RAM, and used later as required by an algorithm designated at a trigger point.

Single Video Channel Interactive Computer Embodiments Providing Personalized Audio Responses While such interactive programming may include a plurality of video signals, the interactive multimedia computer work station 6, described herein, may also provide for personalized audio interactivity by way of a single standard video and audio television signal with a plurality of additional audio signals and/or graphics data for providing interactivity, as shown in FIGS. 10–13. The interaction with the subscribers comes primarily by way of selection of one or more linked audio segments from a plurality of audio segments, whereby the selected audio segment(s) are chosen as a function of previous user responses. Interactivity is enhanced through the use of overlaid graphics displays on the video which like the audio responses, also vary according to selections made by the subscriber on the user interface. Audio segments are used to provide personalized responses to subscriber selections. The graphics, on the other hand, are used to both query the subscriber, preferably at the beginning of the program, and also to provide personalized graphical messages to subscribers. The interactive show also comprises control data for controlling the interactive computer work station.

Multiple audio segments forming the set of suitable responses to an interrogatory message can be sent as part of a standard video signal. There are a number of different ways to effectively forward the necessary audio segments for a given interactive event to the interactive computer. The interactive elements may be broadcast synchronously (alternative responses aligned in time), serially, on separate channels, embedded in the existing video and/or transmitted before or during the program. Audio segments tagged for a given interactive event, can be sent to the interactive computer work stations much earlier than the scheduled event during the program, in which case the segments are preferably stored in temporary memory, or the segments can be transmitted concurrently with the event. With the present invention, it makes no difference how the audio segments reach the interactive computer work station as long as they are available for selection at the computer 6 at the predetermined "trigger points," described below. For example, the audio segments could also be stored in local external data storage such as CD-ROM.

In one preferred "trigger point" embodiment, interactive audio shows can be delivered in the standard television channel. In this embodiment, four audio responses are available at each trigger point, however, only two audio channels need be broadcast, or otherwise input, to the interactive computer 6.

This embodiment has the advantage of requiring merely one television channel. Channel 1 is the "home" channel. When channel 1 is playing, channel 2 is used to download the audio for tracks 3 and 4 to the interactive computer 6. This downloaded audio is stored as wave files in the local unit. When it is time to branch, audio tracks 1 and 2 are played on the two audio input channels, while tracks 3 and 4 are generated from the audio wave files on the interactive computer 6. A seamless branch is made from any one of these channels to any of the other channels.

Figure 10:
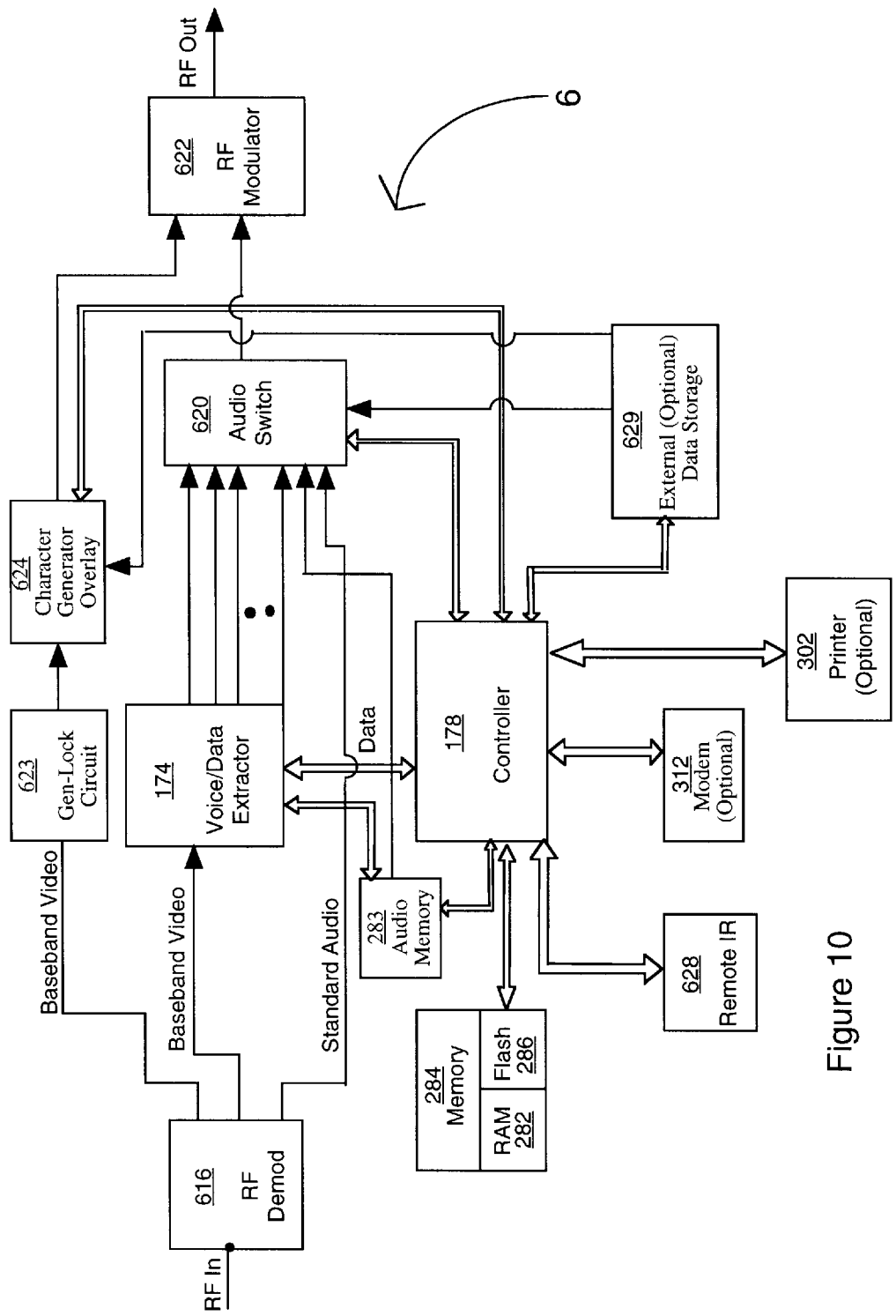
FIG. 10 is a diagram of an interactive computer work station embodiment for branching amongst multiple audio segments in a single video channel embodiment, where the interactive audio and data elements are embedded in the video channel.

FIG. 10 shows an overview of a preferred interactive computer work station embodiment. Other digital and audio alternative embodiments for the provision of audio interactivity are shown in FIGS. 6–8 of U.S. patent application Ser. No. 08/289,499, herein incorporated by reference. The embodiments represent different apparatus for receiving, processing and storing the alternative interactive audio segments which are received in different transmission formats. With these embodiments, the interactive systems are no longer solely limited to selecting audio from multiple parallel tracks of audio, related in time and content, nor is the interactive questions-immediate answer format, as disclosed in previous patents, necessary. Of course, the systems of the present invention can still use the question-immediate answer format or a combination of such format and delayed response via trigger points. The concept remains the same, i.e., to select audio responses which are matched to user selections by some function.

The elements of the audio interactive embodiment can be incorporated and provided by the interactive multi-media work station. Preferably, this configuration comprises a video demodulator board, a keypad for entering subscriber selections, an extractor board for separating the audio signals and data from the conventional video signal, temporary and permanent data storage, a modem 312 (optional), audio switch 620 and a processor 178.

Referring to a preferred embodiment shown in FIG. 10, the video demodulator 616 outputs the standard video signal which is transported to a Gen-lock circuit 623 and character generator 624 as well as to a voice/data extractor 174. At the output of the Gen-Lock circuit 623 and character generator 624, the video is forwarded via the RF modulator 622 to the television or computer display monitor. The processor 178 preferably controls an n×1 switch 620, the output of which is an appropriate audio segment to be sent to the television set for presentation to the subscriber. Of course, the switch could have more than one output, in which case more than one viewer can watch the video on the same monitor and each receives individualized audio response through the use of headphones. The processor 178 sends a command to the audio switch 620 to disconnect the standard audio at the beginning of an interactive segment. The extractor,174 essentially reverses the process by which the audio and data signals were inserted into the video signal. As explained below, the voice/data extractor 174 removes the additional audio segments and data that are hidden in the standard video signal. The data is forwarded to the microprocessor 178 and the audio segments get sent either to an audio switch 620 or to temporary memory 202 depending on where the instructions teach the segments to be forwarded, all of which occurs under the control of the microprocessor 178. The microprocessor 178 reads and interprets the instructions either broadcast in the data codes or resident in the operating software at the interactive work station 6.

The microprocessor 178 interprets the extracted data as either control data, including instructions for switching between voice channels, or graphics data for on screen display. If the data is on-screen display data, the data is preferably prefixed by a command designating the data as on-screen display data, as opposed to control data. In the preferred embodiment, the controller 178 also examines the control data for the occurrence of a header code designating the onset of a trigger point in the program.

If the trigger point codes designate a macro which calls for the placement of a graphics display on the video, the microprocessor 178 reads the codes, accepts any graphics data sent from the head-end, calls for and examines the actual bit maps stored in memory 282, 284, 286 or external memory 629 and designating the identity of the characters, and then commands the character generator 624 to overlay particular characters at particular points on the screen. Therefore, the graphics are preferably generated locally with the bit maps stored in memory 289. The graphics are selected for presentation either in predetermined sequence, through the use of control codes in the composite interactive program, developed when the program was created at the operations center, or more flexibly through the execution of algorithms by the processor 178 utilizing stored subscriber selections to previous graphic interrogatory messages. The algorithms are preferably part of the operating systems software stored in memory at the interactive work station. Alternatively, the algorithms could be included in the data portion of the composite interactive signal.

The graphics can be utilized to overlay any portion of the screen of the television screen. The character generator 624 is locked by a Gen-lock circuit 623 which allows for the synchronous placement of the graphics on the video. The character generator 624 is preferably a standard on-screen display chip which takes incoming video, locks the video and superimposes on the video the characters as instructed by the microprocessor 178. Specifically, the character generator 624 is a switching system which takes the active lines of video and switches to a mode of sending the graphics characters for a predetermined time, and then switches back to the video when the character is finished being written on the screen.

Because the graphics are generated locally, subscribers without the interactive multimedia computer 6 are not be able to view the graphics. For those subscribers possessing the interactive capability, the graphics can be used for both posing interrogatory questions to subscribers at the onset of the program, consistent with the trigger point embodiment, posing questions during the program, or used to provide a personalized response to previous individual subscriber selections.

Preferably at the beginning of the program or when a viewer first tunes in, a series of interrogatory messages are presented to the subscriber. The subscriber responds to the interrogatory message by depressing a button via the user interface device corresponding to an answer selection listed on the interrogatory graphics screen. If the subscriber has made a selection using a remote, a signal is received by the IR interface 628 which processes the signal and forwards the signal to the processor 178. The processor preferably creates a packet comprising the user selection and a header code that identifies the particular interrogatory message associated with user selection and sends the packet to memory 284. Each user selection to each interrogatory is stored in this fashion. These selections will be called later in the program at appropriate times when identified by the trigger point codes and then used in macros or algorithms to determine interactive audio and/or graphics responses.

The presentation of the graphics interrogatory messages can also be made a function of subscriber selections to previous interrogatory messages. The logic used in the codes for selecting the next graphics message is similar to that used for selecting audio messages. One method, as disclosed in earlier ACTV patents, is the "decision tree" logic methodology. The subscriber makes a selection to a first predetermined interrogatory graphics message. After the subscriber hears an appropriately branched audio channel, the processor 178 will interpret graphics algorithmic codes sent down from the operations center 608 and will read from memory 284 an appropriate next graphics message. The processor 178 then directs the character generator 624 to overlay the selected graphics message onto the next frames of video.

Figure 11:
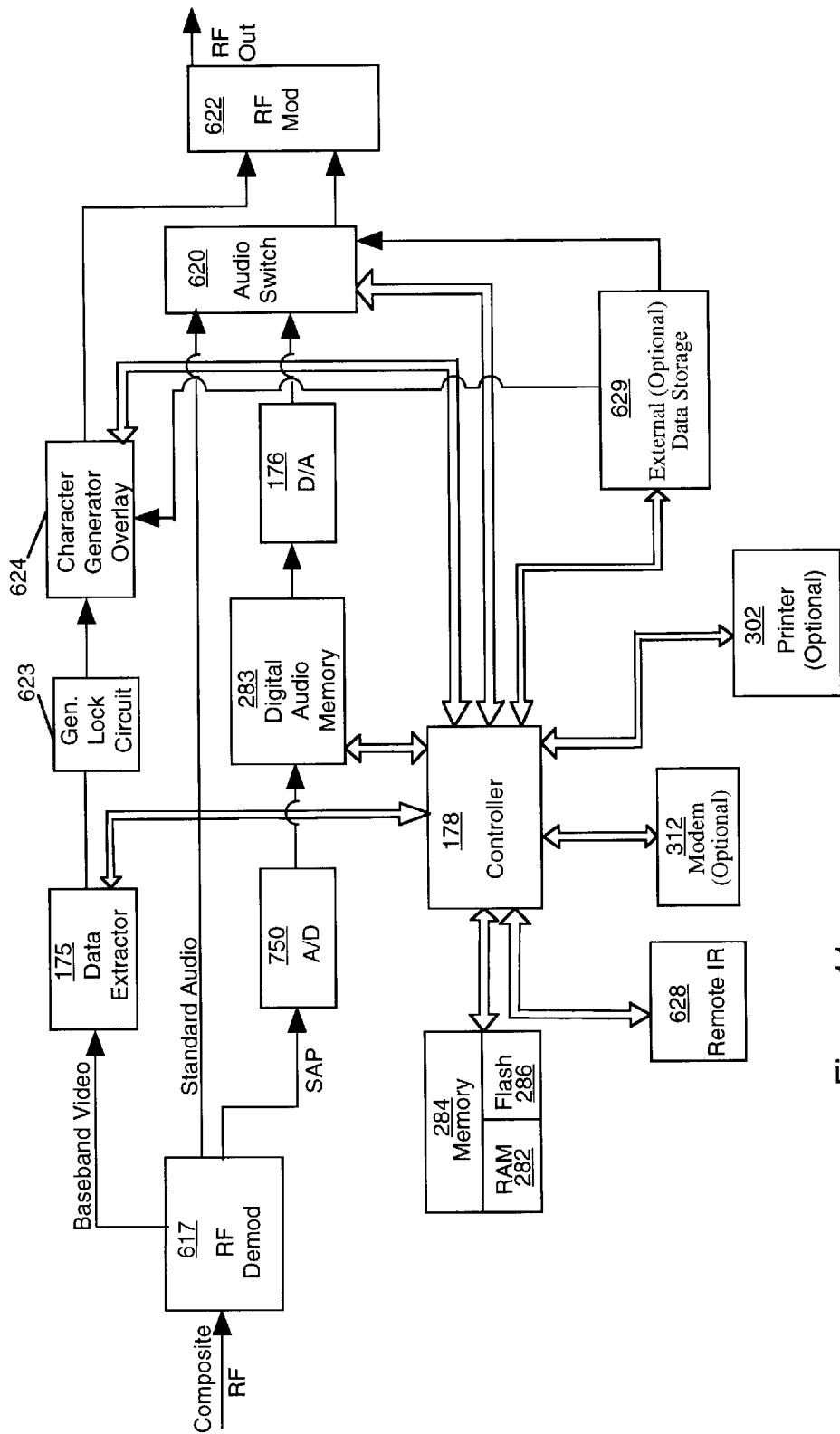
FIG. 11 is a diagram of a second interactive computer work station embodiment for branching amongst multiple audio segments in a single video channel embodiment, where the interactive audio segments are sent in the SAP audio channel.
Figure 12:
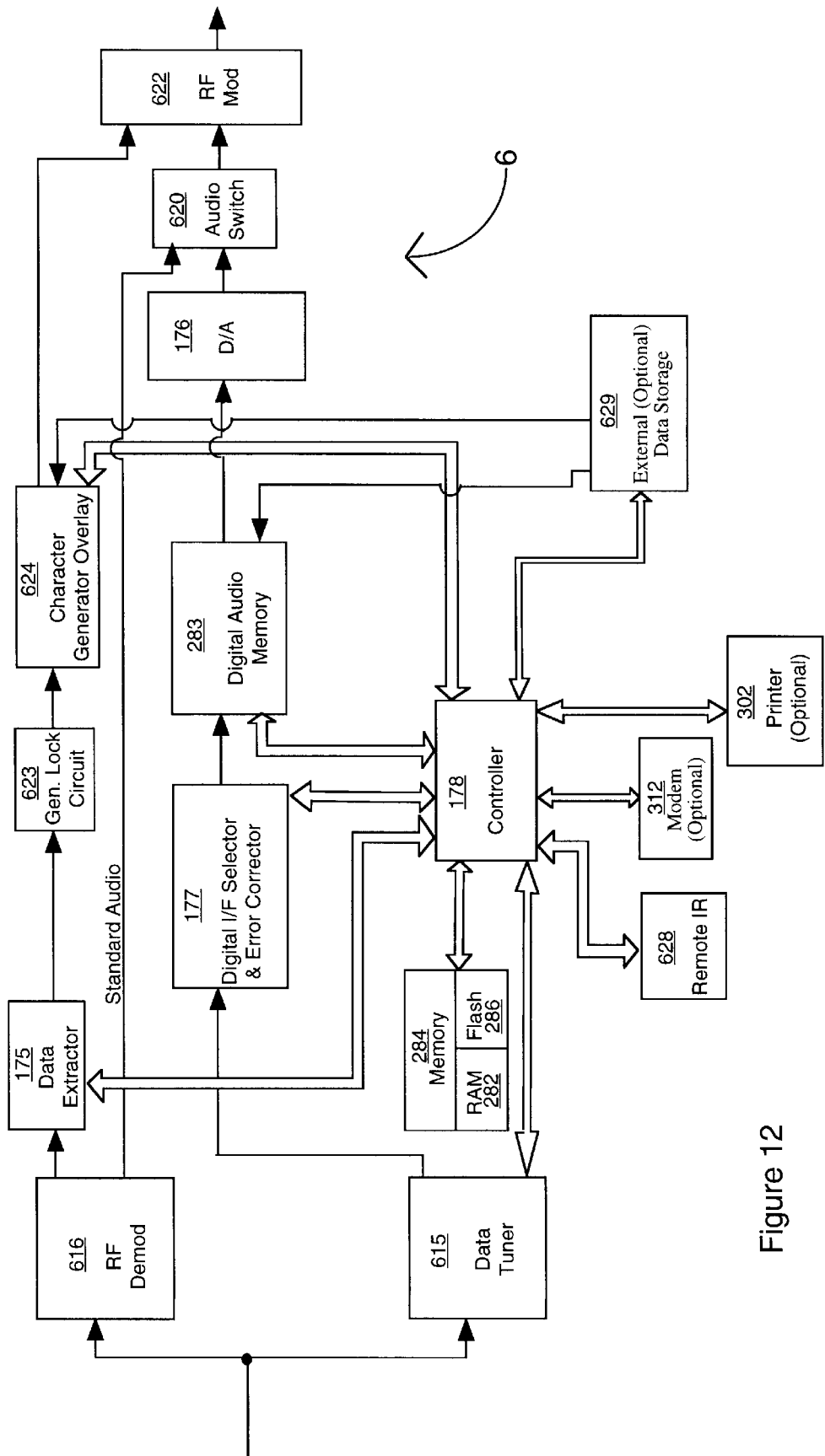
FIG. 12 is a diagram of a third interactive computer work station embodiment for branching amongst multiple audio segments in a single video channel embodiment, where two tuners are employed; the first tuner for tuning to and demodulating the standard video and audio signal and the second of which is for demodulating a secondary analog carrier comprising modulated serial digital audio segments.
Figure 13:
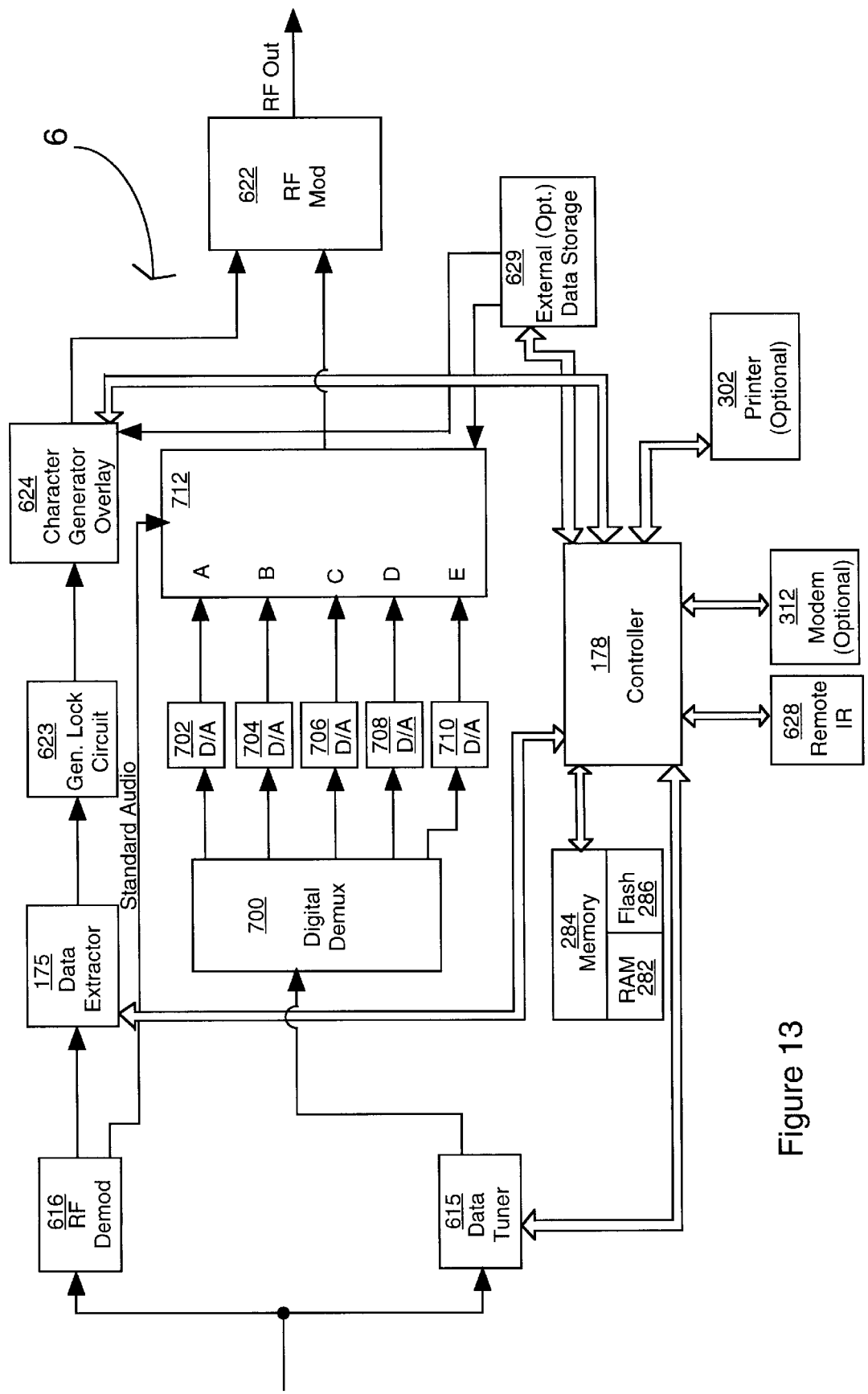
FIG. 13 is a diagram of a fourth interactive computer work station embodiment for branching amongst multiple audio segments in a single video channel embodiment, also comprising two tuners, but with a digital demultiplexer configuration for demultiplexing the digital audio stream into n parallel digital audio channels, wherein the n parallel digital audio channels are time division multiplexed at the head-end and transmitted as a separate digital audio stream.

The advantages discussed above in relation to presenting an interactive program using trigger points are obtainable in each of the interactive computer embodiments shown in FIGS. 11–13. In the embodiment shown in FIG. 11, alternative audio segments are preferably sent serially from the operations center in the SAP channel. The demodulator 617 receives a composite interactive signal comprising the standard video and standard audio signal along with an audio subcarrier. The demodulator 617 breaks the signal into it's component parts, forwarding the baseband video to a data extractor 175 and the standard audio to an audio switch 620. The line 21 data extractor 175 takes out the data codes, including the trigger points.

The SAP channel comprises a plurality of audio segments lined up serially. The audio segments are digitized in the analog to digital converter 750 and are preferably stored in digital audio memory 283. At certain times during the program, data codes will designate a trigger point and key the microprocessor 178 to select and play an audio segment corresponding to previous user input(s), according to the process described above. The microprocessor 178 calls the appropriate audio segment(s) from internal memory or external data storage 629 and commands the audio switch to pass the selected audio segment to the RF modulator 622 for play to the subscriber. At the end of the interactive time period, the controller 178 instructs the audio switch 620 to again pick up the standard audio.

In an alternative embodiment similar to that as shown in FIG. 11 and discussed above, the simple addition of a second tuner, receiving the composite RF signal, could be used to tune to a second audio channel for collection of transmitted audio segments. The tuner would pass the audio segments to the A/D converter with the operation of the rest of the interactive computer workstation similar to that described above in connection with FIG. 11.

FIG. 12 shows another interactive computer workstation embodiment for providing alternative audio and graphics segments. This embodiment uses two tuners: an RF demodulator 616 and a data tuner 615. The RF demodulator 616 tunes to and demodulates the conventional video and audio signal in the standard video bandwidth. The data tuner 615 receives a single digital audio signal. The signal comprises digital serial audio segments modulated onto an analog carrier. The data tuner 615 demodulates the signal into digital audio. The digital interface selector and error corrector 177 separates the audio segments and performs error correction according to any error correction scheme commonly understood in the art. The controller 178 directs the selector 177 to extract selected digital audio segments from the serial digital stream and send them to the digital audio memory 283. Selection of one or more audio segments for play as personalized messages on the speakers occurs according to the processes described above. After the controller 178 commands the memory 283 to forward a digital audio segment, the segment is converted to analog by the digital to audio converter 176 and is subsequently passed to the RF modulator 622 for play on the speakers.

Another interactive computer 6 workstation embodiment for receiving, storing and selecting alternative audio segments is shown in FIG. 13. At the operations center, the audio segments are digitized, time division multiplexed, modulated and converted to frequencies in unused channel frequency space in the cable television spectrum, e.g., cable guard bands.

The RF demodulator 616 again demodulates the conventional video and audio signal. The data extractor 175 receives the signal and extracts the VBI line 21 data codes. The data in the VBI indicates the frequency channels in which the digital audio segments are transmitted. For example, audio messages A–E are located in between channels 14 and 15. The controller 178 instructs the data tuner 615 to tune to that part of the spectrum between channels 14 and 15. Alternatively, an autotune capability can be used to find the audio channels in the spectrum.

The tuner 615 demodulates the digital audio signal and forwards the signal to the digital demultiplexer 700. The demultiplexer 700 demultiplexes the signal into n digital audio channels and forwards each channel to a separate D/A converter 702–710 where each of the digital channels are converted to analog audio. As described above, one of these channels 712 can be selected as identified at the trigger points for play over the audio speaker to the subscriber.

The embodiments described above and shown in connection with FIGS. 10–13 relate to different ways of receiving broadcast audio segments. Alternatively, interactive audio segments, or graphics elements, could be prestored on cartridge, CD ROM, an audio card, or even floppy disk.

Even more enhanced and flexible operation can occur through the addition of external data storage, such as CD ROM or cartridge. For example, sports statistics or other information on athletes or others can be stored in CD ROM. During live sports event either audio segments or graphics displays focusing on the athlete can be called by the processor and presented to the viewer as a function of user selection of an option or at a trigger point if the user indicated during queries at the beginning of the live event that they were interested in a particular player.

Memory

The interactive computer also has the advantage of remembering subscriber responses and using these responses in choosing a video/audio response, and/or graphics interrogatory message, to present to the student. Memory branching is a technique of the present invention where the algorithm assembles video/audio responses and graphics interrogatory messages according to the current and previous user inputs. Memory branching is accomplished by linking video/audio streams and/or successive graphics interrogatory messages together in a logical relationship, as described in U.S. application Ser. No. 08/228,355, herein incorporated by references. In this scheme, the interactive computer processor contains logic (preferably, in the software algorithm) and memory to store previous subscriber selections and to process these previous responses in the algorithm to control future video/audio stream selection, as well as future graphics message selection.

User Profiles

In a preferred embodiment, the interactive computer can have stored in its memory a "user profile." The "user profile" preferably contains characteristics of the particular viewer at that subscriber location, such as sex, hobbies, interests, etc. This user profile is created by having the user respond to a series of questions. Alternatively, the user profiles could be created at a host and sent to the interactive computer over a network. This information is then used by the interactive computer software to create a compendium of the viewer's interests and preferences—i.e., a user profile. The stored user profile would be used in place of the question/answer format, and thus, dictate the branches to interactive segments of interest to the viewer.

Alternatively, the interactive computer 6 can be programmed to create a user profile of each viewer based on the selections made during one of the interactive programs. Furthermore, such a user profile could be modified or enriched over time based on selections made during future interactive programs. For example, the 'memory' technique described above can be used to modify the user profile based on user response over time.

Once the profile is created, the programming choices or interactive responses can be triggered based on the content of the user profile itself. For example, if the user profile suggests that the viewer is particularly interested in sports cars, a sports car commercial could be played for the viewer at a predetermined point in the program. As another application, if a viewer's user profile indicates that the viewer is interested in cooking, whenever the viewer watches such a program, the user profile would trigger the interactive program to download recipes and either display such recipes on the screen or send the recipes to an attached printer 302.

Applications

The embodiments, described above, allow for several possible applications. For example, in a live sports event, one channel could carry the standard video channel, with other channels carrying different camera angles and/or close-ups of particular players.

Audio interactive applications include the recording of audio clips for each player in the game. In this application, the viewer may access a pull-down menu, where he can choose a name of a particular player in the game. When this selection is made, the appropriate audio segment is called from memory and played for the viewer. In a similar manner, statistics in the form of text and graphics can be displayed for a selected player.

Internet Applications

Interactive programs of the present invention can be created using the Internet. Interactive program authors can access a particular Internet site and download graphics, audio and video clips and suggested interactions. The author can then use these elements in the authoring tools to create an interactive program.

Furthermore, viewers can watch interactive programs from the Internet itself using the systems of the present invention. From an Internet site, viewers can access a single channel interactive program, such as described above. The viewer would watch the video on his or her computer, while the audio and/or text/graphics from Web site locations, for example,would be presented as a function of his or her specific choices via interactive commands.

In addition, viewers can choose between multiple video streams originating from a site on the Internet. The seamless branching between different video streams would occur through interactive commands resident in the viewer's computer.

Using the foregoing embodiments, methods and processes, the interactive multimedia computer maximizes personalized attention and interactivity to subscribers in their homes in real time. Although the present invention has been described in detail with respect to certain embodiments and examples, variations and modifications exist which are within the scope of the present invention as defined in the following claims.

We claim:

1. An interactive computer work station for presenting an integrated multimedia interactive presentation, comprising:

a means for receiving an integrated audio, graphics and video presentation, the presentation comprising a common audio and plurality of video signals, and at predetermined times, at least two selectable user options;

a means for interacting with the integrated presentation, wherein the user selects a selectable user option;

a means, connected to the interaction means, for determining an appropriate personalized feedback response, wherein the feedback response may consist of video, audio and graphics segments and the selected feedback response is based on one or more user selected options; and a means, connected to the determination means, for presenting the appropriate personalized feedback response to the viewer and seamlessly switching between the video signals to create a visually transparent segway between video signals, wherein the appropriate personalized feedback response may occur immediately after user selection or at a later predetermined time in the integrated presentation.

2. The interactive computer work station of claim 1, wherein the interactive computer work station further comprises:

a plurality of video sources, each source storing one of the plurality of video signals, wherein least one of the video signals contains data commands;

a means, connected to at least one video source, for extracting data commands, wherein the data commands comprise branching codes;

wherein the determination means comprises:
a means for detecting the branching codes; and
a means, connected to the detection means, for processing the branching codes, wherein the personalized feedback response is based on the branching codes and the user selected options.

3. The interactive computer work station of claim 1 further comprising:

an audio card, connected to the determination means, for storing the plurality of different audio segments.

4. An interactive computer work station for presenting an integrated multimedia interactive presentation, comprising:

a receiver, for receiving a common video signal and a plurality of different video signals, wherein at least one of either the common video or the different video signals has embedded data commands, the data commands comprising branching codes and trigger points;

a means for displaying an integrated audio, graphics and video presentation, the presentation comprising a common audio and the common video signal, and at predetermined times, at least two selectable user options;

a means, connected to the receiver, for extracting data commands;

a means for interacting with the integrated presentation, wherein the user selects a selectable user option;

a means, connected to the interaction and extracting means, for determining an appropriate personalized feedback response, wherein the feedback response may consist of one of the video signals, audio and graphics segments and the selected feedback response is based on one or more user selected options and the branching codes, whereby the feedback responses occur at predetermined trigger points, whereby the trigger point initiates the selection of the personalized response corresponding to an interactive even for presentation to the subscriber; and a means, connected to the determination means, for presenting the appropriate personalized feedback response to the viewer and seamlessly switching between the video signals to create a visually transparent segway between the video signals, wherein the appropriate personalized feedback response may occur immediately after user selection or at a later predetermined time in the integrated presentation.

5. The interactive computer work station of claim 4 further comprising:
an audio card, connected to the determination means, for storing the plurality of different audio segments.

6. An interactive computer work station for presenting an integrated multimedia interactive presentation, comprising:
a means for receiving interactive programming, the interactive programming comprising a plurality of video signals and audio signals;
a viewer interface for receiving viewer entries;
a microprocessor, connected to the viewer interface, for selecting one of the video and audio signals, and the selection of the video and audio signals is based on the branching codes and the received viewer entries; and
a means, connected to the microprocessor, for presenting the selected video and audio signal to the viewer, wherein the switch to the selected video signal is seamless thereby creating a visually transparent segway between the video signals.

7. A live interactive programming system, comprising:
an interactive computer workstation for receiving live interactive programming, the live interactive programming comprising a plurality of video signals, audio signals, and branching codes, the workstation comprising:
a viewer interface for receiving viewer entries;
a microprocessor, connected to the viewer interface, for selecting one of the video and audio signals and directing a switch to the selected video and audio signals at a predetermined time, the selection of the video and audio signals and the predetermined time of each selection a function of the branching codes and the received viewer entries;
a means, connected to the microprocessor, for switching to the selected video signal, wherein the switch is seamless thereby creating a visually transparent segway between the video signals;
a means for displaying the selected video signal; and
a means for playing the selected audio signal.

8. The live interactive programming system of claim 7, wherein the different video signals correspond to different predetermined camera angles of an event.

9. The live interactive programming system of claim 7, wherein the plurality of video signals are digitally compressed.

10. The live interactive programming system of claim 7, wherein the live programming further contains graphics signals and the microprocessor selects one of the graphics signals at a predetermined time, the selection of the graphics signal a function of the branching codes and the received viewer entries, and further comprising a means, connected to the microprocessor, for presenting the selected graphics signal on the display means.

11. The live interactive programming system of claim 7, wherein the display means presents at least one interrogatory to the viewer, the content of the interrogatory involving program options, and the viewer entries corresponds to collected entries from the viewer via the viewer interface in response to the interrogatories.

12. A live interactive digital programming system, comprising:
an interactive computer workstation for receiving live interactive programming, the live interactive programming comprising a plurality of digitally compressed video, audio, branching codes and graphics signals, the workstation comprising:
a viewer interface for receiving viewer entries;
a microprocessor, connected to the viewer interface, for selecting one of the video and audio signals and directing a switch to the selected video and audio signals at a predetermined time, the selection of the video and audio signals and the predetermined time of each selection a function of the branching codes and the received viewer entries, wherein the switch to the selected video signal is seamless so as to create a visually transparent segway between video signals;
a demultiplexer, for demultiplexing the selected video and audio signals;
a decompressor/decoder, connected to the demultiplexer for decompressing the demultiplexed selected video and audio signals;
a means for displaying the selected video signal; and
a means for playing the selected audio signal.

13. The live interactive digital programming system of claim 12, wherein the plurality of digitally compressed video signals corresponds to different predetermined camera angles of an event.

14. The live interactive digital programming system of claim 12, wherein the microprocessor selects one of the graphics signals at a predetermined time, the selection of the graphics signal a function of the branching codes and the received viewer entries, and further comprising a means, connected to the microprocessor, for presenting the selected graphics signal on the display means.

15. The live digital programming system of claim 12, wherein the display means presents at least one interrogatory to the viewer, the content of the interrogatory involving program options, and the viewer entries correspond to collected entries from the viewer via the viewer interface in response to the interrogatories.

16. A method for presenting an integrated multimedia interactive presentation on a interactive computer work station, comprising the steps of:
receiving an integrated audio, graphics and video presentation, the presentation comprising a common audio and a plurality of video signals, and at predetermined times, at least two selectable user options;
interacting with the integrated presentation, wherein the user selects a selectable user option;
determining an appropriate personalized feedback response, wherein the feedback response may consist of video, audio and graphics segments and the selected feedback response is based on one or more user selected options; and
presenting the appropriate personalized feedback response to the viewer and seamlessly switching between the video signals to create a visually transparent segway between the video signals, wherein the appropriate personalized feedback response may occur immediately after user selection or at a later predetermined time in the integrated presentation.

17. A method for presenting an integrated multimedia interactive presentation on an interactive computer work station, comprising:
receiving a common video signal and a plurality of different video signals, wherein at least one of the video signals has embedded data commands, the data commands comprising branching codes and trigger points;
a means for displaying an integrated audio, graphics and video presentation, the presentation comprising a common audio and the common video signal, and at predetermined times, at least two selectable user options;

extracting data commands;

interacting with the integrated presentation, wherein the user selects a selectable user option;

determining an appropriate personalized feedback response, wherein the feedback response may consist of video, audio and graphics segments and the selected feedback response is based on one or more user selected options and the branching codes, whereby the feedback responses occur at predetermined trigger points, whereby the trigger point initiates the selection of the personalized response corresponding to an interactive even for presentation to the subscriber; and presenting the appropriate personalized feedback response to the viewer and seamlessly switching between the video signals to create a transparent segway between the video signals, wherein the appropriate personalized feedback response may occur immediately after user selection or at a later predetermined time in the integrated presentation.

18. An interactive computer work station for presenting an integrated multimedia interactive presentation, comprising:

a television, wherein the television receives an integrated multimedia program, the program containing a common video signal and a plurality of different video signals, wherein at least one of the video signals has data commands, comprising:

a means for displaying an integrated audio, graphics and video presentation, the presentation comprising a common audio and the common video signal, and at predetermined times, at least two selectable user options; and an interactive computer workstation, operably connected to the television set, comprising:

a means for receiving the integrated multimedia program;

a means, connected to the receiving means, for extracting data commands from at least one of the video signals, wherein the data commands comprise branching codes;

a means for interacting with the integrated presentation, wherein the user selects a selectable user option;

a microprocessor, connected to the interaction and extracting means, for determining an appropriate personalized feedback response based on one or more user selected options and the branching codes, wherein if at least part of the response includes switching to a selected video signal, the switch to the selected video signal is seamless in order to create visually transparent segway between video signals; and a means, connected to the determination means, for sending commands to the television set to present on the display monitor the appropriate personalized feedback response for the viewer.

19. A computer network for presenting an integrated multimedia interactive presentation, comprising:

a video server, wherein the video server stores and processes interactive programs, comprising:

means for transmitting the interactive programs;

at least one interactive computer workstation, connected to the video server, comprising:

a means for receiving the interactive program, the interactive program comprising a common audio and common video signal and a plurality of different video signals, and at predetermined times, at least two selectable user options;

a means for interacting with the integrated presentation, wherein the user selects a selectable user option;

a means, connected to the interaction means, for determining an appropriate personalized feedback response, wherein the feedback response may consist of video, audio and graphics segments and the selected feedback response is based on one or more user selected options; and a means, connected to the determination means, for presenting the appropriate personalized feedback response to the viewer and seamlessly switching between the video signals to create a visually transparent segway between the video signals, wherein the appropriate personalized feedback response may occur immediately after user selection or at a later predetermined time in the integrated presentation.

* * * * *